(12) United States Patent
Yamashita et al.

(10) Patent No.: US 7,128,456 B2
(45) Date of Patent: Oct. 31, 2006

(54) LIGHT SOURCE DEVICE

(75) Inventors: Tomoyoshi Yamashita, Kanagawa (JP); Issei Chiba, Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 62 days.

(21) Appl. No.: 10/501,711

(22) PCT Filed: Jan. 16, 2003

(86) PCT No.: PCT/JP03/00307

§ 371 (c)(1),
(2), (4) Date: Jul. 19, 2004

(87) PCT Pub. No.: WO03/069222

PCT Pub. Date: Aug. 21, 2003

(65) Prior Publication Data
US 2005/0041410 A1 Feb. 24, 2005

(30) Foreign Application Priority Data

Jan. 18, 2002 (JP) .............................. 2002-010719
Mar. 22, 2002 (JP) .............................. 2002-080869

(51) Int. Cl.
*F21V 7/04* (2006.01)

(52) U.S. Cl. ..................... 362/606; 362/615; 362/620; 362/626

(58) Field of Classification Search ................. 362/606, 362/617, 626, 614, 607, 615, 620
See application file for complete search history.

(56) References Cited

U.S. PATENT DOCUMENTS 5,703,518 A * 12/1997 Yamamoto .................. 327/354
5,703,667 A * 12/1997 Ochiai ......................... 349/65
6,002,829 A   12/1999 Winston et al.
6,256,447 B1   7/2001 Laine
6,412,969 B1 * 7/2002 Torihara et al. ............. 362/609
6,502,947 B1 * 1/2003 Matsumoto et al. ........ 362/626
6,648,485 B1 * 11/2003 Colgan et al. .............. 362/600
6,799,868 B1 * 10/2004 Brown et al. ............... 362/259
6,805,925 B1 * 10/2004 Uchida et al. ............... 428/1.3

FOREIGN PATENT DOCUMENTS

JP        8-254606      10/1996

(Continued)

*Primary Examiner*—Renee Luebke
*Assistant Examiner*—Zahra I. Bennett
(74) *Attorney, Agent, or Firm*—Morgan, Lewis & Bockius, LLP

(57) ABSTRACT

A light source device comprising at least a primary light source (1), a light guide (3) guiding light beamed from the primary light source and having a light incident surface (31) and a light outgoing surface (33), an optical deflector (4) disposed adjacent to the light guide's light outgoing surface and having a light incident surface (41) and a light outgoing surface (42), and a light diffuser (6) disposed adjacent to the optical deflector's light outgoing surface and having a light incident surface (61) and a light out going surface (62), wherein the optical deflector's light incident surface is formed with a plurality of rows of prisms arranged in parallel to each other, and the light diffuser has the full width half maximum of an outgoing light intensity of 1–13 degrees when parallel rays of light are incident, whereby providing a light source device excellent in light utilization efficiency of a primary light source, and also excellent in viewing angle characteristics and quality as an image forming illumination without sacrificing high brightness characteristics.

9 Claims, 7 Drawing Sheets

FOREIGN PATENT DOCUMENTS

| | | |
|---|---|---|
| JP | 8-304631 | 11/1996 |
| JP | 11-353915 | 12/1999 |
| JP | 2000-353413 | 12/2000 |
| JP | 2001-143515 | 5/2001 |
| JP | 2001-290062 | 10/2001 |
| JP | 2001-343507 | 12/2001 |
| JP | 2002-245823 | 8/2002 |
| JP | 2002-245824 | 8/2002 |

* cited by examiner

LIGHT SOURCE DEVICE

TECHNICAL FIELD

The present invention relates to an edge-light type light source device forming a liquid crystal display device or the like that is used as a display portion in a notebook personal computer, a liquid crystal television, a portable telephone (cellular phone), a portable information terminal (personal digital assistants), or the like.

BACKGROUND ART

In recent years, color liquid crystal display devices have been widely used in various fields as monitors of portable notebook personal computers, personal computers, and so forth, or as display portions of liquid crystal televisions, video-combined liquid crystal televisions, portable telephones, portable information terminals, and so forth. Further, following increase in information processing amount, diversification of needs, multimedia adaptation, and so forth, increase in screen size and fineness of the liquid crystal display devices has been actively developed.

The liquid crystal display device basically comprises a backlight portion and a liquid crystal display element portion. For the backlight portion, there is an under-light type wherein a light source is disposed directly under the liquid crystal display element portion, or an edge-light type wherein a light source is disposed facing a side end surface of a light guide. In terms of making compact the liquid crystal display device, the edge-light type has often been used.

In recent years, for a display device with a relatively small screen size wherein a viewing direction range is relatively narrow, such as a liquid crystal display device used as a display portion of, for example, a portable telephone, use has been made of, in terms of reducing power consumption, one, as a backlight portion of the edge-light type, that reduces a spread angle of light emitted from a screen as much as possible to emit light in a concentrated manner in a required angle range for effectively utilizing the quantity of light emitted from a primary light source.

In the display device wherein the viewing direction range is limited as described above, as a light source device that emits light in a concentrated manner in a relatively narrow range for increasing the utilization efficiency of the quantity of light of a primary light source to thereby reduce the power consumption, the present applicant has proposed in JP(A)-2001-143515 to use a prism sheet having prism-formed surfaces on both sides thereof so as to dispose it adjacent to a light outgoing surface of a light guide. In this double-sided prism sheet, a light entrance surface being one surface and a light exit surface being the other surface are respectively formed with a plurality of mutually parallel elongated prisms, wherein the directions of the elongated prisms are matched with each other on the light entrance surface and the light exit surface and further the elongated prisms are disposed at corresponding positions on both surfaces. With this configuration, light having a peak of outgoing light in a direction inclined relative to the light outgoing surface of the light guide and exiting from the light outgoing surface so as to be distributed in a proper angle range is incident on one-side prism surfaces at the light entrance surface of the prism sheet, then is internally reflected by the other-side prism surfaces, and is further subjected to a refraction action by the elongated prisms at the light exit surface, so that the light is emitted in a concentrated manner in a relatively narrow, required direction range.

According to this light source device, the concentrated light emission in the narrow angle range is enabled. However, in the prism sheet used as a light deflector, the plurality of mutually parallel elongated prisms are required such that the directions of the elongated prisms are matched with each other on the light entrance surface and the light exit surface, and further, the elongated prisms are disposed at the corresponding positions on both surfaces. This formation is complicated.

Further, there has also been a problem that since the light emitted in a concentrated manner in such a narrow angle range causes strong glare, the quality as the backlight is deteriorated. Moreover, although such a light source device having the narrow viewing angle raises no problem in case of a small-size backlight, there has also been a problem that, as a backlight for a liquid crystal display device of 4 inches or greater, particularly as a backlight used in a liquid crystal display device of about 12 to 15 inches for a notebook personal computer, its viewing angle is so narrow, resulting in poor visibility.

It is therefore an object of the present invention to provide a light source device excellent in light utilization efficiency of a primary light source, and also excellent in viewing angle characteristic and quality for image forming illumination without sacrificing a high luminance characteristic.

DISCLOSURE OF THE INVENTION

According to the present invention, there is provided a light source device comprising, at least, a primary light source, a light guide that guides light emitted from the primary light source and has a light incident surface on which the light emitted from the primary light source is incident, and a light outgoing surface from which the guided light exits, a light deflector having a light entrance surface disposed adjacent to the light outgoing surface of the light guide and located so as to face the light outgoing surface, and a light exit surface on an opposite side relative to the light entrance surface, and a light diffuser having an incident surface disposed adjacent to the light exit surface of the light deflector and located so as to face the light exit surface of the light deflector, and an outgoing surface on an opposite side relative to the incident surface, wherein a plurality of elongated prisms arrayed side by side are formed at the light entrance surface of the light deflector, each of the elongated prisms has two prism surfaces and, assuming a plurality of virtual elongated prisms arrayed at the same pitch as that of the elongated prisms of the light deflector and each having a triangular shape in section wherein peak light in a distribution of outgoing light from the light outgoing surface of the light guide is incident on one of virtual prism surfaces and totally internally reflected by the other virtual prism surface to exit from the light exit surface in a desired direction, at least one of the prism surfaces is formed into a convex curved surface shape using a shape of each of the virtual elongated prisms as a reference, and the light diffuser is configured in such a manner that a full width half maximum of an outgoing light luminous intensity distribution is 1 to 13 degrees when parallel light is incident thereon.

According to the present invention, there is also provided a light source device comprising, at least, a primary light source, a light guide that guides light emitted from the primary light source and has a light incident surface on which the light emitted from the primary light source is incident, and a light outgoing surface from which the guided light exits, a light deflector having a light entrance surface disposed adjacent to the light outgoing surface of the light guide and located so as to face the light outgoing surface, and a light exit surface on an opposite side relative to the light entrance surface, and a light diffuser having an incident surface disposed adjacent to the light exit surface of the light deflector and located so as to face the light exit surface of the light deflector, and an outgoing surface on an opposite side relative to the incident surface, wherein a plurality of elongated prisms arrayed side by side are formed at the light entrance surface of the light deflector, each of the elongated prisms has two prism surfaces and, assuming a plurality of virtual elongated prisms arrayed at the same pitch as that of the elongated prisms of the light deflector and each having a triangular shape in section wherein peak light in a distribution of outgoing light from the light outgoing surface of the light guide is incident on one of virtual prism surfaces and totally internally reflected by the other virtual prism surface to exit from the light exit surface in a desired direction, at least one of the prism surfaces is formed into a convex curved surface shape using a shape of each of the virtual elongated prisms as a reference, a full width half maximum of a luminance distribution of outgoing light from the light exit surface of the light deflector is 19 to 26 degrees, and the light diffuser is configured in such a manner that a full width half maximum of an outgoing light luminous intensity distribution is 1 to 8 degrees when parallel light is incident thereon.

According to the present invention, there is also provided a light source device comprising, at least, two primary light sources, a light guide that guides lights emitted from the primary light sources and has two light incident surfaces on which the lights emitted from the two primary light sources are respectively incident and which are disposed on opposite sides to each other, and a light outgoing surface from which the guided lights exit, the light guide having a developed length greater than 8 cm and equal to or less than 28 cm, a light deflector having a light entrance surface disposed adjacent to the light outgoing surface of the light guide and located so as to face the light outgoing surface, and a light exit surface on an opposite side relative to the light entrance surface, and a light diffuser having an incident surface disposed adjacent to the light exit surface of the light deflector and located so as to face the light exit surface of the light deflector, and an outgoing surface on an opposite side relative to the incident surface, wherein a plurality of elongated prisms arrayed side by side are formed at the light entrance surface of the light deflector, each of the elongated prisms has two prism surfaces and, assuming a plurality of virtual elongated prisms arrayed at the same pitch as that of the elongated prisms of the light deflector and each having a triangular shape in section wherein peak light in a distribution of outgoing light from the light outgoing surface of the light guide is incident on one of virtual prism surfaces and totally internally reflected by the other virtual prism surface to exit from the light exit surface in a desired direction, at least one of the prism surfaces is formed into a convex curved surface shape using a shape of each of the virtual elongated prisms as a reference, and the light diffuser is configured in such a manner that a full width half maximum of an outgoing light luminous intensity distribution is 0.7 to 13 degrees when parallel light is incident thereon.

According to the present invention, there is also provided a light source device comprising, at least, a primary light source, a light guide that guides light emitted from the primary light source and has a light incident surface on which the light emitted from the primary light source is incident, and a light outgoing surface from which the guided light exits, a light deflector having a light entrance surface disposed adjacent to the light outgoing surface of the light guide and located so as to face the light outgoing surface, and a light exit surface on an opposite side relative to the light entrance surface, and a light diffuser having an incident surface disposed adjacent to the light exit surface of the light deflector and located so as to face the light exit surface of the light deflector, and an outgoing surface on an opposite side relative to the incident surface, wherein the light diffuser is configured in such a manner that a full width half maximum of an outgoing light luminous intensity distribution has an anisotropy when parallel light is incident thereon.

BEST MODE FOR CARRYING OUT THE INVENTION

Hereinbelow, embodiments of the present invention will be described with reference to the drawings.

Figure 1:
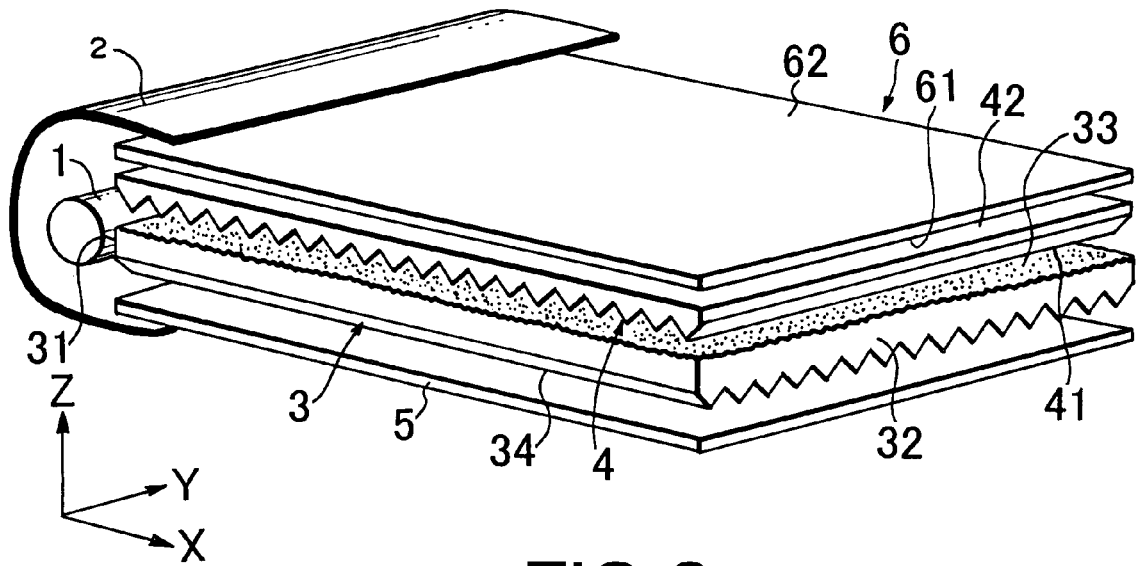
FIG. 1 is a schematic perspective view showing a light source device according to the present invention.

FIG. 1 is a schematic perspective view showing one embodiment of a surface light source device (planar light source device) according to the present invention. As illustrated in FIG. 1, the light source device of the present invention comprises a light guide 3 in which at least one side end surface serves as a light incident surface 31 and one surface substantially perpendicular thereto serves as a light outgoing surface 33, a primary light source 1 disposed so as to face the light incident surface 31 of the light guide 3 and covered with a light source reflector 2, a light deflector 4 disposed on the light outgoing surface of the light guide 3, a light diffuser 6 disposed on a light exit surface (light outgoing surface) 42 of the light deflector 4 so as to face it, and a light reflector 5 disposed so as to face a back surface 34 of the light guide 3 on its side opposite to the light outgoing surface 33.

The light guide 3 is disposed in parallel to the XY-plane and forms a rectangular plate shape on the whole. The light guide 3 has four side end surfaces wherein at least one of a pair of the side end surfaces parallel to the YZ-plane is used as the light incident surface 31. The light incident surface 31 is disposed so as to face the primary light source 1 so that light emitted from the primary light source 1 enters the light guide 3 through the light incident surface 31. In the present invention, for example, a light source may also be disposed so as to face another side end surface such as a side end surface 32 located on a side opposite to the light incident surface 31.

Two principal surfaces of the light guide 3 that are substantially perpendicular to the light incident surface 31 are located substantially in parallel to the XY surface, respectively, and either one surface (upper surface in the figure) is used as the light outgoing surface 33. A directive light-emitting function portion in the form of a roughened surface, a directive light-emitting function portion in the form of a lens surface on which a number of elongated lenses such as elongated prisms, elongated lenticular lenses, V-shaped grooves, or the like are formed side by side substantially parallel to the light incident surface 31, or the like is given to at least one of the light outgoing surface 33 and the back surface 34, so that light entering through the light incident surface 31 is guided in the light guide 3 and emitted from the light outgoing surface 33 as light having a directivity in the plane (XZ-plane) that is perpendicular to the light incident surface 31 and the light outgoing surface 33. An angle formed between a direction of a peak of an outgoing light luminous intensity distribution in the XZ-plane distribution and the light outgoing surface 33 is set to α. This angle α is, for example, 10 to 40 degrees, and the full width half maximum of the outgoing light luminous intensity distribution is, for example, 10 to 40 degrees.

It is preferable in terms of improving the uniformity degree of luminance in the light outgoing surface 33 that the roughened surface or the elongated lenses formed on the surface of the light guide 3 be so set that an average inclination angle θa pursuant to ISO4287/1-1984 falls within the range of 0.5 to 15 degrees. The average inclination angle θa more preferably falls within the range of 1 to 12 degrees, and further preferably 1.5 to 11 degrees. It is preferable that the average inclination angle θa be set in the optimum range according to a ratio (L/t) of a thickness (t) of the light guide 3 and a length (L) thereof in a direction of propagation of the incident light. That is, when use is made of the light guide 3 having L/t of about 20 to 200, the average inclination angle θa is preferably set to 0.5 to 7.5 degrees, more preferably 1 to 5 degrees, and further preferably 1.5 to 4 degrees. On the other hand, when use is made of the light guide 3 having L/t of about 20 or less, the average inclination angle θa is preferably set to 7 to 12 degrees, and more preferably 8 to 11 degrees.

The average inclination angle θa of the roughened surface formed on the light guide 3 can be derived from the following equations (1) and (2) with an inclination function f(x) obtained by measuring a shape of the roughened surface using a contact-stylus type surface roughness meter and setting coordinates in a measurement direction as x, according to ISO4287/1-1984. Herein, L represents a measured length and Δa represents a tangent of the average inclination angle θa.

$$\Delta a = (1/L) \int_0^L (d/dx) f(x) dx \qquad (1)$$

$$\theta a = \tan^{-1}(\Delta a) \qquad (2)$$

Further, the light guide 3 has a light emission ratio preferably in the range of 0.5 to 5%, and more preferably 1 to 3%. This is because when the light emission ratio becomes smaller than 0.5%, there is a tendency that the quantity of light exiting from the light guide 3 decreases so that a sufficient luminance cannot be obtained, while, when the light emission ratio becomes greater than 5%, there is a tendency that a large quantity of light exits in the vicinity of the primary light source 1 so that attenuation of the outgoing light becomes significant in the X-direction on the light outgoing surface 33 to thereby lower the uniformity degree of luminance at the light outgoing surface 33. By setting the light emission ratio of the light guide 3 to 0.5 to 5% as described above, it is possible to provide a light source device that can emit from the light guide 3 the light having an exiting characteristic of a high directivity such that the angle of the peak light in the outgoing light luminous intensity distribution (in the XZ-plane) of the light exiting from the light outgoing surface falls within the range of 50 to 80 degrees relative to a normal of the light outgoing surface and the full width half maximum of the outgoing light luminous intensity distribution (in the XZ-plane) in the XZ-plane perpendicular to both the light incident surface and the light outgoing surface is 10 to 40 degrees, that can efficiently deflect a direction of the emission by the light deflector 4, and that can achieve a high luminance.

In the present invention, the light emission ratio of the light guide 3 is defined as follows. A light intensity ($I_0$) of outgoing light at an edge of the light outgoing surface 33 on the side of the light incident surface 31 and an outgoing light intensity (I) at a position of a distance L from the edge of the light outgoing surface 33 on the side of the light incident surface 31 satisfies a relationship of the following equation (3) given that the thickness (dimension in Z-direction) of the light guide 3 is t.

$$I = I_0 \cdot \alpha (1-\alpha)^{L/t} \qquad (3)$$

where a constant α represents the light emission ratio and is a ratio (%) of emission of light from the light guide 3 per unit length (length corresponding to the light guide thickness t) on the light outgoing surface 33 in the X-direction perpendicular to the light incident surface 31. With the axis of ordinates representing logarithm of light intensity of outgoing light from the light outgoing surface 23 and the axis of abscissas representing (L/t), a relationship thereof is plotted so that the light emission ratio α can be derived from a gradient thereof.

Further, it is preferable that a lens surface arranged with a number of elongated lenses extending in the direction (X-direction) substantially perpendicular to the light incident surface 31 be formed at the other principal surface, on which the directive light emitting function portion is not formed, for controlling the directivity of the outgoing light from the light guide 3 in the plane (YZ-plane) parallel to the primary light source 1. In the embodiment illustrated in FIG. 1, the light outgoing surface 33 is formed into a roughened surface, while the back surface 34 is formed with a lens surface composed of an array of a number of elongated lenses extending in the direction (X-direction) substantially perpendicular to the light incident surface 31. In the present invention, conversely to the embodiment illustrated in FIG. 1, the light outgoing surface 33 may be formed with the lens surface while the back surface 34 may be formed into the roughened surface.

When forming the elongated lenses at the back surface 34 or the light outgoing surface 33 of the light guide 3, the elongated lenses may be elongated prisms, elongated lenticular lenses, V-shaped grooves, or the like extending substantially in the X-direction, while it is preferable that the elongated lenses be elongated prisms having a substantially triangular shape in YZ-section.

In the present invention, when forming the elongated prisms as the elongated lenses at the light guide 3, a vertical angle thereof is preferably set in the range of 70 to 150 degrees. This is because setting the vertical angle in this range makes it possible to sufficiently condense the outgoing light from the light guide 3 to thereby achieve sufficient improvement in luminance as the light source device. Specifically, setting the prism vertical angle in this range makes it possible to emit the condensed outgoing light in which the full width half maximum of the outgoing light luminous intensity distribution is 35 to 65 degrees in the plane including the peak light in the outgoing light luminous intensity distribution and perpendicular to the XZ-plane, to thereby improve the luminance of the light source device. When forming the elongated prisms at the light outgoing surface 33, the vertical angle is preferably set in the range of 80 to 100 degrees, while, when forming the elongated prisms at the back surface 34, the vertical angle is preferably set in the range of 70 to 80 degrees or 100 to 150 degrees.

In the present invention, instead of forming the light emitting function portion at the light outgoing surface 33 or the back surface 34 as described above or in addition thereto, a directive light emitting function may be given by mixing and dispersing light diffusion particles in the light guide. Further, for the light guide 3, various shapes such as a wedge shape and a boat shape can be used without being limited to the shape illustrated in FIG. 1.

The light deflector 4 is disposed on the light outgoing surface 33 of the light guide 3. Two principal surfaces 41 and 42 of the light deflector 4 are arranged in parallel to each other on the whole and are respectively located in parallel to the XY-plane on the whole. One (the principal surface located so as to face the light outgoing surface 33 of the light guide 3) of the principal surfaces 41 and 42 serves as a light entrance surface (light incident surface) 41, while the other serves as the light exit surface 42. The light exit surface 42 is in the form of a flat surface parallel to the light outgoing surface 33 of the light guide 3. The light entrance surface 41 is in the form of a prism-formed surface having a number of elongated prisms extending in the Y-direction and arranged in parallel to each other. The prism-formed surface may be provided with flat portions each having a relatively narrow width (e.g. flat portions each having a width substantially equal to or smaller than an X-direction dimension of the elongated prism) between the adjacent elongated prisms. However, in terms of enhancing the utilization efficiency of light, it is preferable to array the elongated prisms continuously in the X-direction without providing the flat portions.

Figure 2:
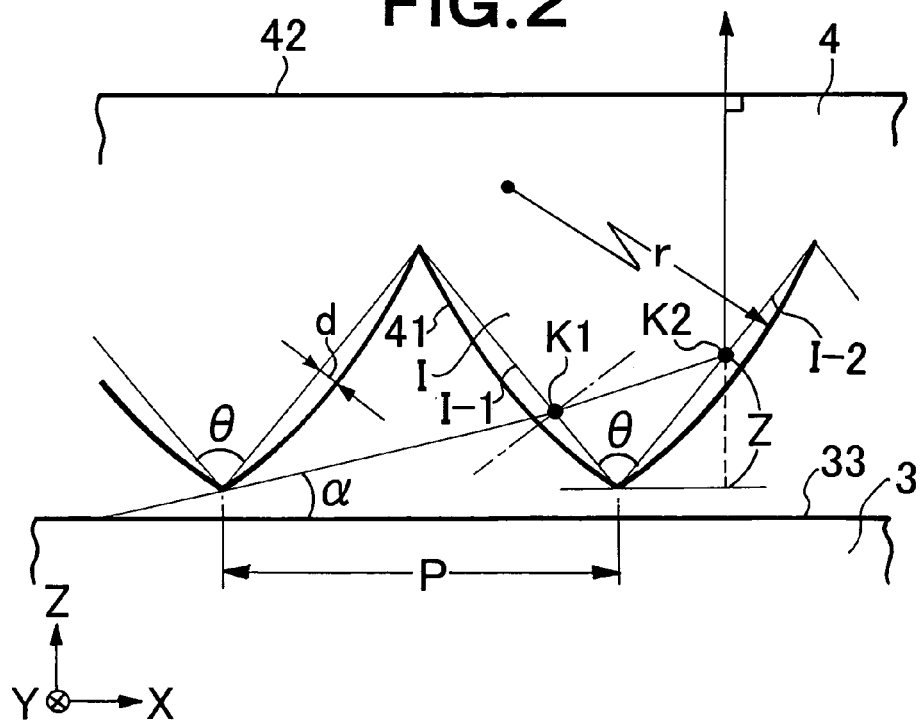
FIG. 2 is an explanatory diagram of the shape of each of elongated prisms of a light entrance surface of a light deflector.

FIG. 2 is an explanatory diagram of the shape of each elongated prism of the light entrance surface 41 of the light deflector 4. The shape of each elongated prism of the light entrance surface 41 is set in the following manner.

Specifically, at the outset, virtual elongated prisms I each having a triangular shape in section are set under the condition that the arraying pitch of the elongated prisms is P. It is given that an angle (i.e. virtual prism vertical angle) formed between two prism surfaces (i.e. virtual prism surfaces) I-1 and I-2 of each virtual elongated prism I is θ. This virtual prism vertical angle θ is set such that peak light (inclination angle: α) of an outgoing light luminous intensity distribution in the XZ-plane of light arriving from the light outgoing surface 33 of the light guide 3 is incident upon the virtual elongated prism I and totally internally reflected by the virtual prism surface I-2, and then advances, for example, in the normal direction of the light exit surface 42. For example, when peak light of light that is emitted from the light exit surface 42 of the light deflector 4 is directed toward the vicinity of the normal direction (e.g. in the range of ±10 degrees from the normal direction) of the light exist surface 42, the virtual prism vertical angle θ is preferably set in the range of 50 to 80 degrees, more preferably 55 to 75 degrees, and further preferably 60 to 70 degrees. Further, an inclination angle (angle formed relative to the light exit surface 42) of one of the virtual prism surfaces of the virtual elongated prism is preferably set to 45 degrees or more, more preferably 47 degrees or more, and further preferably 50 degrees or more for efficiently deflecting the outgoing light from the light guide 3 in a desired direction by the light deflector 4.

Then, the shape of an actual elongated prism is determined in such a manner that at least one of the prism surfaces forms a shape of a convex curved surface relative to the shape of the virtual elongated prism I set in the foregoing manner. Specifically, it is preferable to determine the shape of the actual elongated prism as follows. It is assumed that peak light (inclination angle: α) of an outgoing light luminous intensity distribution (in the XZ-plane) of light emitted from the light outgoing surface 33 of the light guide 3 grazes the vertex portion of an adjacent virtual elongated prism on the side of the primary light source 1 so as to enter the virtual elongated prism I, and this peak light is set as virtual light. A position where this virtual light passes through the virtual prism surface I-1 is set to K1, while a position where it reaches the virtual prism surface I-2 is set to K2.

Typically, it is preferable that all the surface located closer to the light exit surface 42 than the position K2 be formed into a convex curved surface shape. On the other hand, at a position located closer to the light entrance surface 41 (i.e. a position located farther from the light exit surface 42) than the total internal reflection position K2 of the virtual prism surface I-2 in the virtual elongated prism I, it may be formed into either a flat shape or a convex curved surface shape. In either case, it is preferable to form a shape so as to prolong the prism surface shape in the vicinity of the position K2 on the side of the light exit surface 42. The vertex portion of the elongated prism does not necessarily coincide with the vertex portion of the virtual elongated prism.

With respect to the shape of the elongated prism, it is preferable that, at a position located closer to the light exit surface 42 than the total internal reflection position K2 of the virtual prism surface I-2 in the virtual elongated prism I, at least a part or all thereof be formed into a convex curved surface shape having an inclination angle of a prism surface that is greater than the inclination angle of the virtual prism surface I-2 of the virtual elongated prism I.

This means that, at a Z-direction position where a dimension z (Z-direction distance between the vertex of the elongated prism and the internal reflection position K2 of the virtual prism surface I-2) shown in FIG. 2 is equal to or greater than a value given by the following equation (4):

$$z = \{(P \cdot \tan \alpha \cdot \cot [\theta/2]/(\tan \alpha + \cot [\theta/2]))\}$$

$$[\cot [\theta/2] + \{\cot \theta/(\cot [\theta/2] - \cot \theta)\}] \quad (4)$$

the actual prism surface is set to have an inclination angle greater than an inclination angle of the virtual prism surface I-2 of the virtual elongated prism I given by the following equation (5):

$$n \cos [3\theta/2] = \sin(\alpha - [\theta/2]) \quad (5)$$

(in the equation, n represents a refractive index of the elongated prism).

By setting the shape of each elongated prism of the light entrance surface 41 as described above, a luminance distribution angle (full width half maximum) of light exiting from the light deflector 4 can be reduced. The reason thereof is as follows. Specifically, light arriving at a position located closer to the light exit surface 42 than the total internal reflection position K2 of the virtual prism surface I-2 in the virtual elongated prism I is a set of light rays that are incident from a side lower than the vertex portion of the adjacent virtual elongated prism on the side of the primary light source at inclination angles greater than α. Therefore, the direction of its peak light is a direction of inclination greater than α so that the direction of peak light of totally internally reflected light thereof becomes a direction that is inclined from the normal direction of the light exit surface 42 toward a direction along the virtual prism surface of total internal reflection. Such light serves to broaden a luminance distribution of the outgoing light from the light exit surface 42. Therefore, by setting the inclination angle of the prism surface of the actual elongated prism to be greater than the inclination angle of the corresponding virtual prism surface at at least a part of the position located closer to the light exit surface 42 than the total internal reflection position K2 of the virtual prism surface I-2 in the virtual elongated prism I so as to concentratedly emit the quantity of light in a particular direction, it is possible to correct an advance direction of the light actually reflected totally internally in this region to shift toward the normal direction of the light exit surface 42 as compared with the reflected light on the virtual prism surface to thereby achieve higher luminance and narrower visual field.

It is possible to form the foregoing convex curved surface shape at the whole position located closer to the light exit surface 42 than the total internal reflection position K2 of the virtual prism surface I-2 in the virtual elongated prism I and to keep as it is the shape of the virtual prism surface I-2 of the virtual elongated prism at a position located farther from the light exit surface 42 than the total internal reflection position K2, or it is possible to form the convex curved surface shape over the whole prism surface including the position located farther from the light exit surface 42 than the total internal reflection position K2. Such a convex curved surface shape can be exemplified by a convex cylindrical surface shape having a radius of curvature r and sharing at least the bottom portion with the virtual elongated prism.

Here, a value (r/P) of the radius of curvature r normalized by the pitch P is preferably set in the range of 2 to 80, more preferably 7 to 30, and further preferably 8 to 20. This is because setting r/P in this range makes it possible to sufficiently narrow the full width half maximum of an outgoing light luminance distribution (in the XZ-plane) of light exiting from the light exit surface 42 of the light deflector 4 to thereby sufficiently increase the luminance of the light source device. For example, when the pitch of the elongated prisms is 40 to 60 μm, the radius of curvature r is preferably set in the range of 250 to 3000 μm, more preferably 350 to 1000 μm, and further preferably 400 to 700 μm.

It is preferable that the convex curved surface shape of each elongated prism of the light deflector 4 be set to a relatively gently curved surface shape in such a manner that a ratio (d/P) of a maximum distance d between the virtual prism surface of the virtual elongated prism and the prism surface of the convex curved surface shape relative to the arraying pitch P of the elongated prisms falls within the range of 0.05 to 5%, more preferably 0.1 to 3%, and further preferably 0.2 to 2%. This is because when d/P exceeds 5%, there is a tendency that a light condensing effect by the light deflector 4 is spoiled to cause occurrence of divergence of light, and therefore, the full width half maximum of the outgoing light luminance distribution (in the XZ-plane) of the light exiting from the light exit surface 42 of the light deflector 4 cannot be sufficiently narrowed. Conversely, when d/P is less than 0.05%, there is a tendency that the light condensing effect by the light deflector 4 becomes insufficient, and therefore, the full width half maximum of the outgoing light luminance distribution (in the XZ-plane) of the light exiting from the light exit surface 42 of the light deflector 4 cannot be sufficiently narrowed.

In the present invention, the convex curved surface shape of each elongated prism of the light deflector 4 is not limited to the foregoing circular arc shape in section having the radius of curvature r, but may be a convex curved surface shape having a non-circular-arc shape in section inasmuch as d/P is within the foregoing range.

In the present invention, it is preferable that the prism surface having the foregoing convex curved surface shape be formed at at least the prism surface located on the side farther from the primary light source 1. In accordance therewith, the luminance distribution angle width of light exiting from the light deflector 4 can be made sufficiently small when the primary light source 1 is disposed also at the end surface 32 of the light guide 3. For example, when the ratio of light, which is propagated in the light guide 3 and reflected by the end surface 32 on the side remote from the light incident surface 31 and returns, is relatively high, it is more preferable that the prism surface on the side closer to the primary light source 1 be also formed into the convex curved surface shape. Particularly, it is preferable that the prism surface on the side closer to the primary light source 1 be symmetrical in shape with the actual prism surface corresponding to the virtual prism surface I-2 with respect to the normal direction of the light exit surface 42. On the other hand, when the ratio of light, which is propagated in the light guide 3 and reflected by the end surface 32 on the side remote from the light incident surface 31 and returns, is relatively low, the prism surface on the side closer to the primary light source 1 may be formed into a flat shape. On the other hand, when it is necessary to sharpen the vertex portion (definitely form an edge at the tip of the vertex portion) of each elongated prism for the purpose of suppressing occurrence of a sticking phenomenon upon placing the light deflector 4 on the light guide 3, it is preferable to form flat the prism surface on the side closer to the primary light source 1 because it becomes easier to form the vertex portion of the elongated prism based on the fact that more accurate formation of the shape of a shape transfer surface of a forming die member for elongated prism formation is made possible as compared to a case where both prism surfaces are formed as the convex curved surfaces.

In the light deflector of the present invention, a flat portion or a curved surface portion may be formed at the vertex portion of each elongated prism for the purpose of accurately producing a desired prism shape to achieve a stable optical performance and of suppressing abrasion or deformation of the prism vertex portion during assembling or during use of the light source device. In this case, in terms of suppressing reduction in luminance of the light source device and occurrence of a nonuniform pattern of luminance due to the sticking phenomenon, the width of the flat portion or the curved surface portion formed at the vertex portion of each elongated prism is preferably set to 3 μm or less, more preferably 2 μm or less, and further preferably 1 μm or less.

As described above, by placing the foregoing light deflector 4 on the light outgoing surface 33 of the light guide 3 with its elongated prism formed surface being located on the side of the light entrance surface, the outgoing light luminous intensity distribution in the XZ-plane of the directive outgoing light exiting from the light outgoing surface 33 of the light guide 3 can be further narrowed so that it is possible to achieve higher luminance and narrower visual field of the light source device. The full width half maximum of the outgoing light luminance distribution in the XZ-plane of the outgoing light from such a light deflector 4 preferably falls within the range of 5 to 26 degrees, more preferably 10 to 20 degrees, and further preferably 12 to 18 degrees. This is because difficulty in viewing an image or the like due to extreme narrowing of the visual field can be prevented by setting the full width half maximum of the outgoing light luminance distribution (in the XZ-plane) to 5 degrees or more, while higher luminance and narrower visual field can be achieved by setting it to 26 degrees or less.

Since the visual field narrowing of the light deflector 4 in the present invention is affected by a degree of spread (full width half maximum) of the outgoing light luminous intensity distribution (in the XZ-plane) of the light from the light outgoing surface 33 of the light guide 3, the ratio of a full width half maximum A of the outgoing light luminance distribution (in the XZ-plane) of the light from the light exit surface 42 of the light deflector 4 relative to a full width half maximum B of the outgoing light luminous intensity distribution (in the XZ-plane) of the light from the light outgoing surface 33 of the light guide 3 also changes depending on the full width half maximum B of the outgoing light luminous intensity distribution (in the XZ-plane) of the light from the light guide 3. For example, when the full width half maximum B of the outgoing light luminous intensity distribution (in the XZ-plane) of the light from the light guide 3 is less than 26 degrees, the full width half maximum A preferably falls within the range of 30 to 95% of the full width half maximum B, more preferably 30 to 80%, and further preferably 30 to 70%. On the other hand, when the full width half maximum B of the outgoing light luminous intensity distribution (in the XZ-plane) of the light from the light guide 3 is 26 degrees or more, the full width half maximum A preferably falls within the range of 30 to 80% of the full width half maximum B, more preferably 30 to 70%, and further preferably 30 to 60%. Particularly, when the full width half maximum B of the outgoing light luminous intensity distribution (in the XZ-plane) of the light from the light guide 3 is 26 to 36 degrees, the full width half maximum A preferably falls within the range of 30 to 80% of the full width half maximum B, more preferably 30 to 70%, and further preferably 30 to 60%. Further, when the full width half maximum B of the outgoing light luminous intensity distribution (in the XZ-plane) of the light from the light guide 3 exceeds 36 degrees, the full width half maximum A preferably falls within the range of 30 to 70% of the full width half maximum B, more preferably 30 to 60%, and further preferably 30 to 50%.

As described above, in the present invention, since the effect of visual field narrowing increases as the full width half maximum of the outgoing light luminous intensity distribution (in the XZ-plane) of the light from the light guide 3 increases, it is preferable, in terms of efficiency of visual field narrowing, to use the light deflector 4 in combination with the light guide 3 wherein the full width half maximum B of the outgoing light luminous intensity distribution (in the XZ-plane) is 26 degrees or more, and more preferably in combination with the light guide 3 wherein the full width half maximum B exceeds 36 degrees. On the other hand, although the effect of visual field narrowing is small when the full width half maximum of the outgoing light luminous intensity distribution (in the XZ-plane) of the light from the light guide 3 is small, since higher luminance can be achieved as the full width half maximum of the outgoing light luminous intensity distribution (in the XZ-plane) of the light from the light guide 3 decreases, it is preferable, in terms of achieving higher luminance, to use the light deflector 4 in combination with the light guide 3 wherein the full width half maximum B of the outgoing light luminous intensity distribution (in the XZ-plane) is less than 26 degrees.

Further, in the present invention, in order to properly control a visual field range depending on a purpose while suppressing reduction in luminance as much as possible in the light source device that achieves narrower visual field and higher luminance by the use of the light deflector 4 as described above, the light diffuser 6 is adjacently disposed on the light exit surface of the light deflector 4. Further, in the present invention, by disposing the light diffuser 6 in this manner, it is also possible to suppress glare, luminance spots, and the like which cause deterioration in quality, to thereby achieve improvement in quality.

The light diffuser 6 may be formed integral with the light deflector 4 on the side of the light exit surface thereof, or may be individually placed on the side of the light exit surface of the light deflector 4. Preferably, the light diffuser 6 is individually disposed. When individually placing the light diffuser 6, it is preferable that an incident surface (light incident surface) 61, facing the light deflector 4, of the light diffuser 6 be formed so as to have a convex-concave structure for preventing sticking with the light deflector 4. Likewise, it is also necessary to take into account the sticking between an outgoing surface (light outgoing surface) 62 of the light diffuser 6 and a liquid crystal display element to be disposed thereon, and it is thus preferable to give a convex-concave structure also to the surface of the light diffuser 6 on the exit side thereof. When this convex-concave structure is given only for the purpose of preventing the sticking, the average inclination angle thereof is preferably set to 0.7 degrees or more, more preferably 1 degree or more, and further preferably 1.5 degrees or more.

Figure 3:
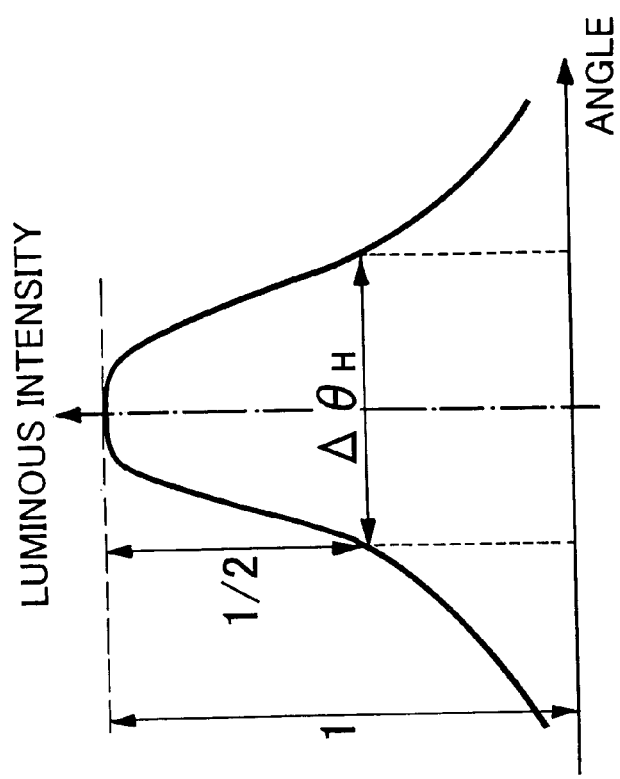
FIG. 3 is an explanatory diagram of a full width half maximum of an outgoing light luminous intensity distribution of a light diffuser.
Figure 3:
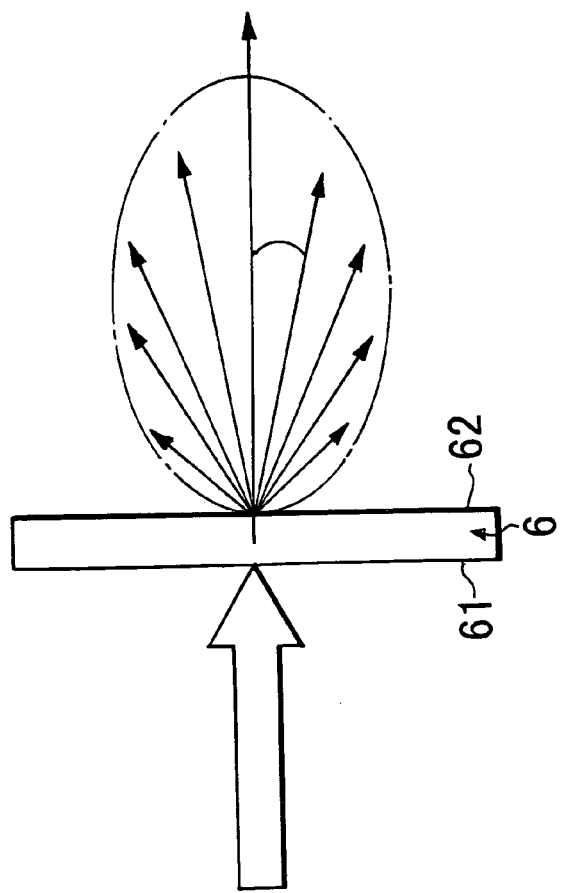

In the present invention, it is preferable that use be made of the light diffuser 6 having a light diffusion property for properly diffusing the outgoing light from the light deflector 4, taking into account the balance among luminance characteristic, visibility, quality, and so forth of the light source device. Specifically, when the light diffusion property of the light diffuser 6 is low, there is a tendency that it becomes difficult to sufficiently broaden the viewing angle to lower the visibility so that the quality improving effect becomes insufficient. Conversely, when the light diffusion property is too high, there is a tendency that the effect of visual field narrowing by the light deflector 4 is spoiled and the whole light ray transmissivity is also reduced to lower the luminance. Therefore, as the light diffuser 6 of the present invention, use is made of one that is configured in such a manner that the full width half maximum of an outgoing light luminous intensity distribution falls within the range of 1 to 13 degrees when parallel light is incident thereon. The full width half maximum of the outgoing light luminous intensity distribution of the light diffuser 6 is preferably in the range of 3 to 11 degrees, and more preferably 4 to 8.5 degrees. In the present invention, as shown in FIG. 3, the full width half maximum of the outgoing light luminous intensity distribution of the light diffuser 6 shows a degree to which parallel light rays incident on the light diffuser 6 diffuse to spread upon exiting, and represents an angle ($\Delta\theta_H$) of the full width of a spread angle at a half value relative to a peak value in an luminous intensity distribution of outgoing light that passes through the light diffuser 6 to be diffused.

Such a light diffusion property can be given by mixing a light diffusion agent into the light diffuser 6 or by forming a convex-concave structure to at least one of the surfaces of the light diffuser 6. The convex-concave structure differs in degree between a case where it is formed on one of the surfaces of the light diffuser 6 and another case where it is formed on both surfaces thereof. When forming the convex-concave structure on one of the surfaces of the light diffuser 6, the average inclination angle thereof is preferably set in the range of 0.8 to 12 degrees, more preferably 3.5 to 7 degrees, and further preferably 4 to 6.5 degrees. When forming the convex-concave structure on both surfaces of the light diffuser 6, the average inclination angle of the convex-concave structure formed on one of the surfaces is preferably set in the range of 0.8 to 6 degrees, more preferably 2 to 4 degrees, and further preferably 2.5 to 4 degrees. In this case, it is preferable that the average inclination angle on the incident surface side of the light diffuser 6 be set greater than the average inclination angle on the outgoing surface side thereof for suppressing reduction of the whole light ray transmissivity of the light diffuser 6.

Further, in terms of improving the luminance characteristic and visibility, a haze value of the light diffuser 6 is preferably set in the range of 8 to 82%, more preferably 30 to 70%, and further preferably 40 to 65%.

In the light source device of the present invention, it is also required that the luminance in a display area (i.e. an effective light-emitting area corresponding to an effective display area of a display element such as a liquid crystal display element used in combination with the light source device) as observed from a normal direction of the light-emitting surface (the outgoing surface 62 of the light diffuser 6) be uniform. The uniformity of luminance also depends on the size of a display area of the light source device. For example, in a large-size light source device applied to one with a large effective display area such as a notebook personal computer or a personal computer monitor, a relatively wide viewing angle characteristic may be required wherein a luminance distribution (in the XZ-plane) of outgoing light exiting from a light-emitting surface is required to be broadened. On the other hand, in a small-size light source device applied to one with a small effective display area such as a portable telephone or a portable information terminal, high luminance or improvement in quality of display image forming illumination may be given priority wherein a luminance distribution (in the XZ-plane) of outgoing light exiting from a light-emitting surface is allowed to be relatively narrow. Therefore, as the light diffuser 6, use is preferably made of one having a proper light diffusion property depending on the size of the display area of the light source device.

Figure 4:
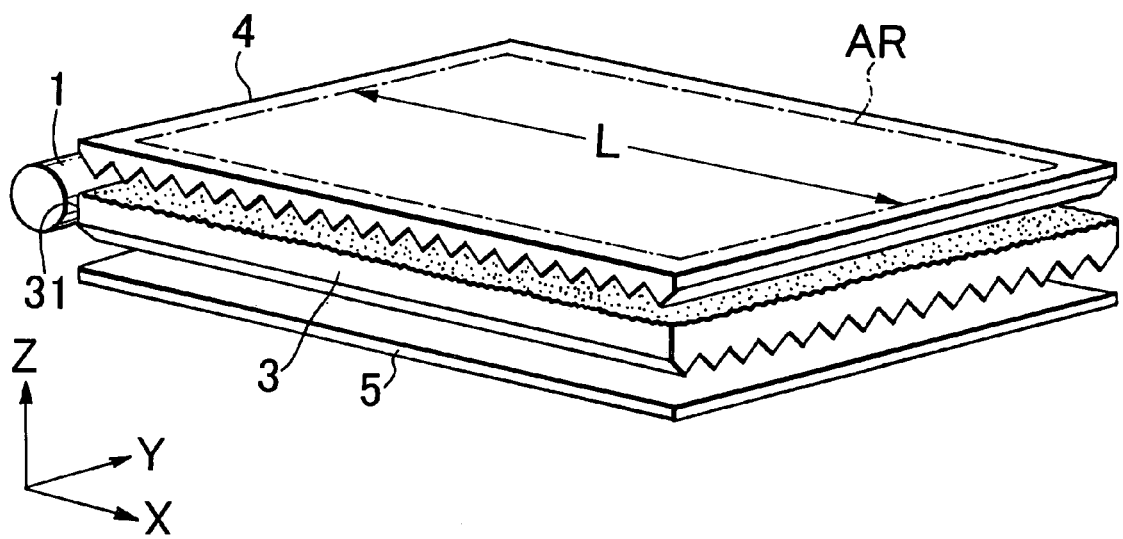
FIG. 4 is an explanatory diagram of a developed length of a light source device.
Figure 5:
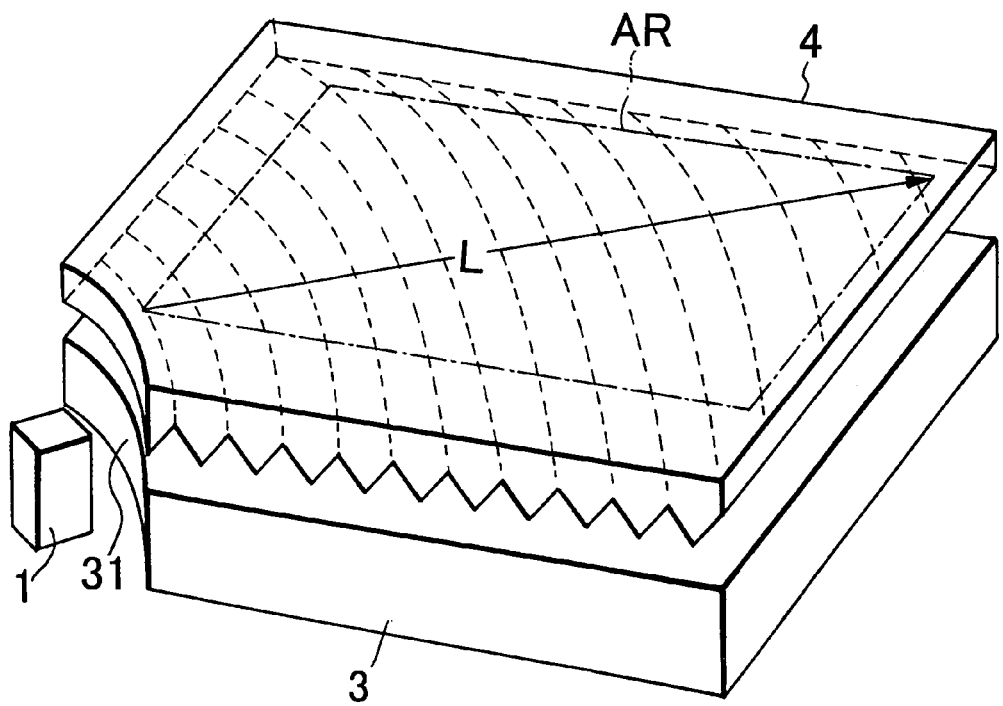
FIG. 5 is an explanatory diagram of a developed length of a light source device.

Description will be made of such a light diffusion property of the light diffuser 6 that depends on the size of the display area of the light source device. Note that the size of the display area of the light source device will be described using a developed length thereof as a reference. As illustrated in FIG. 4, when a linear cold-cathode light source is disposed as a primary light source 1 facing a light incident surface 31 of a light guide 3, the developed length of the light source device (developed length of the light guide 3) represents a maximum length L of a display area AR in a direction where light entering the light guide 3 is guided, i.e. in the X-direction perpendicular to the light incident surface 31. On the other hand, as illustrated in FIG. 5, when a point light source such as an LED is disposed as a primary light source 1 facing a light incident surface 31 formed at a corner of a light guide 3, the developed length represents a distance L of a display area AR connecting between a position farthest from the point light source and a position closest to the point light source.

(1) In case of the developed length of the light guide 3 being 8 cm or less

Since such a light source device uses as the primary light source 1 a liner cold-cathode tube (one-lamp type) or an LED and is used in a display device with a small effective display area of a portable telephone, a portable information terminal, a digital camera, or the like, it is not necessary to increase the viewing angle so much, while it is necessary to give a light diffusion property, by the light diffuser 6, to a degree that can suppress glare, luminance spots, and the like which cause deterioration in quality, to enhance the light utilization efficiency to maintain high luminance, and to suppress the power consumption to be low. Therefore, for the light diffuser 6, the full width half maximum of the outgoing light luminous intensity distribution is preferably in the range of 1 to 6 degrees, more preferably 1 to 5 degrees, and further preferably 2 to 5 degrees. Further, the haze value is preferably in the range of 8 to 60%, more preferably 8 to 50%, and further preferably 20 to 50%. Furthermore, when the convex-concave structure is formed on the surface of the light diffuser 6, the average inclination angle thereof is preferably in the range of 0.8 to 5 degrees, more preferably 0.8 to 4 degrees, and further preferably 2 to 4 degrees.

(2) In case of the developed length of the light guide 3 being greater than 8 cm and equal to or less than 23 cm (one-lamp type cold-cathode tube is used as the primary light source 1)

Since such a light source device is used in a display device of a notebook personal computer, a monitor of a desktop personal computer, a relatively small-size liquid crystal television, or the like, a relatively wide viewing angle is required and, following the demand for higher resolution of the liquid crystal display devices, high luminance with high quality is required. Therefore, for the light diffuser 6, the full width half maximum of the outgoing light luminous intensity distribution is preferably in the range of 3 to 11 degrees, more preferably 4 to 10 degrees, and further preferably 4 to 9 degrees. Further, the haze value is preferably in the range of 30 to 80%, more preferably 40 to 73%, and further preferably 45 to 70%. Furthermore, when the convex-concave structure is formed on the surface of the light diffuser 6, the average inclination angle thereof is preferably in the range of 3 to 9.5 degrees, more preferably 3.5 to 8.5 degrees, and further preferably 4.5 to 7 degrees.

Particularly, when the developed length of the light guide 3 is greater than 8 cm and equal to or less than 18 cm, since such a light source device is used in a display device of, for example, a relatively small-size notebook personal computer, a required viewing angle is somewhat narrow. Therefore, for the light diffuser 6, the full width half maximum of the outgoing light luminous intensity distribution is preferably in the range of 3 to 8 degrees, more preferably 4 to 8 degrees, and further preferably 4 to 7 degrees. Further, the haze value is preferably in the range of 30 to 70%, more preferably 40 to 65%, and further preferably 45 to 60%. Furthermore, when the convex-concave structure is formed on the surface of the light diffuser 6, the average inclination angle thereof is preferably in the range of 3 to 7 degrees, more preferably 3.5 to 6.5 degrees, and further preferably 4.5 to 6 degrees.

On the other hand, particularly when the developed length of the light guide 3 is greater than 18 cm and equal to or less than 22 cm, since such a light source device is used in a display device of, for example, a relatively large-size notebook personal computer, a relatively wide viewing angle is required and further the uniformity of luminance in the display area is required to be achieved. Therefore, for the light diffuser 6, the full width half maximum of the outgoing light luminous intensity distribution is preferably in the range of 4 to 10 degrees, more preferably to 9 degrees, and further preferably 5 to 8.5 degrees. Further, the haze value is preferably in the range of 40 to 75%, more preferably 50 to 70%, and further preferably 50 to 65%. Furthermore, when the convex-concave structure is formed on the surface of the light diffuser 6, the average inclination angle thereof is preferably in the range of 3.5 to 8 degrees, more preferably 4 to 7 degrees, and further preferably 4.5 to 6.5 degrees.

Furthermore, particularly when the developed length of the light guide 3 is greater than 22 cm and equal to or less than 23 cm, such a light source device is used in a display device of, for example, a relatively large-size notebook personal computer. In this case, as the notebook personal computer using the one-lamp type cold-cathode tube as the primary light source 1, the display area is large. Therefore, as compared to one having the developed length of the light guide 3 being 22 cm or less, it is necessary to increase the light utilization efficiency to improve the luminance. For increasing the luminance as described, for example, as a reflection sheet disposed on the back surface of the light guide 3 of the light source device, a metal reflection sheet such as a silver reflection sheet or an aluminum reflection sheet excellent in directive reflection property is required to be used in place of an expanded PET reflection film having a low directive reflectivity. However, when the metal reflection sheet is used, there is significant occurrence of defects such as glare peculiar to metal reflection, dark lines and bright lines appearing in the vicinity of the light incident surface of the light guide, and dark portions appearing in the vicinity of both ends of the light incident surface of the light guide so that the quality as the light source device tends to be spoiled. In order to suppress such quality degradation, it is necessary to use the light diffuser 6 having a high light diffusion property such that the full width half maximum of the outgoing light luminous intensity distribution exceeds 9 degrees. However, there is a problem that usage of such a light diffuser 6 makes the light diffusion property too large and causes large reduction of the whole light ray transmissivity, and therefore, a sufficiently high luminance can not be achieved. In view of this, in addition to suppressing such quality degradation in the light guide 3 and the light deflector 4, use is preferably made of, as the light diffuser 6, one that is configured such that the full width half maximum of the outgoing light luminous intensity distribution is in the range of 5 to 11 degrees, more preferably 6 to 10 degrees, and further preferably 7 to 9 degrees. Further, the haze value is preferably in the range of 50 to 80%, more preferably 55 to 73%, and further preferably 55 to 70%. Furthermore, when the convex-concave structure is formed on the surface of the light diffuser 6, the average inclination angle thereof is preferably in the range of 4.5 to 9.5 degrees, more preferably 5 to 8.5 degrees, and further preferably 5 to 7 degrees.

(3) In case of the developed length of the light guide 3 being greater than 8 cm and equal to or less than 28 cm (multi-lamp type cold-cathode tubes are used as primary light sources 1)

Figure 6:
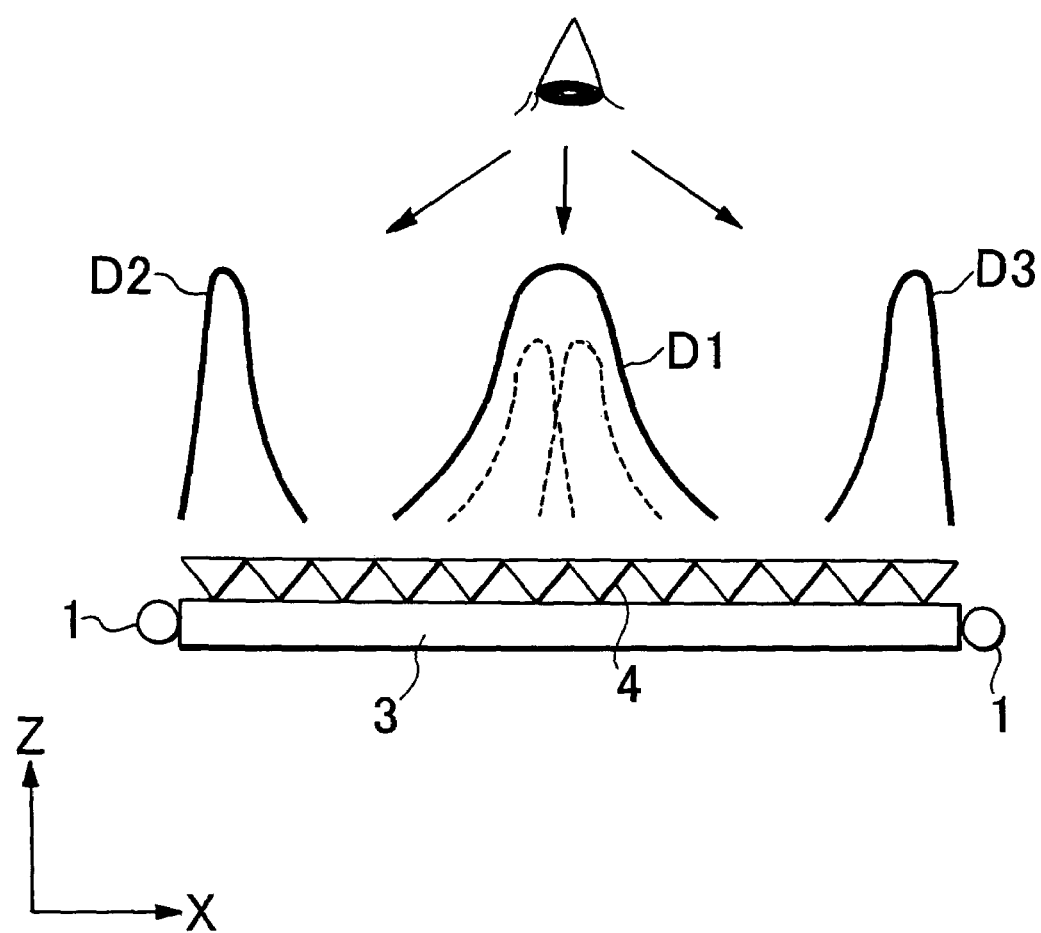
FIG. 6 is an explanatory diagram showing a luminance distribution (in the XZ-plane) of outgoing light from the light deflector of the light source device of the present invention.

Since such a light source device is used in a display device of a monitor of a desktop personal computer, a liquid crystal television, or the like, a relatively wide viewing angle is required and further a high luminance is required. Therefore, as the primary light sources 1, use is made of the multi-lamp type wherein one or more cold-cathode tubes are disposed at each of two mutually substantially parallel end surfaces of the light guide 3. In this light source device, the visibility relating to quality differs from the light source device using the one-lamp type primary light source 1. Asymmetry of an outgoing light luminance distribution (in the XZ-plane) as described later disappears and, as shown in FIG. 6, an outgoing light luminance distribution (in the XZ-plane) D1 in the vicinity of the center portion of the light source device is improved in symmetry even when the light diffuser 6 is not used. Further, outgoing light luminance distributions (in the XZ-plane) D2 and D3 in the vicinity of both ends close to the primary light sources are affected by lights emitted from the closest primary light sources 1 and guided, so as to be somewhat asymmetric, respectively. Specifically, in the vicinity of the left-side end portion in FIG. 6, the outgoing light luminance distribution (in the XZ-plane) D2 shows the tailing tendency steep on the side of the adjacent primary light source and smooth on the center side, and therefore, exiting directions of light in the vicinity of the left-side end portion include somewhat more components directed toward the center portion. On the other hand, in the vicinity of the right-side end portion in FIG. 6, the outgoing light luminance distribution (in the XZ-plane) D3 shows the tailing tendency steep on the side of the adjacent primary light source and smooth on the center side, and therefore, exiting directions of light in the vicinity of the right-side end portion include somewhat more components directed toward the center portion. Consequently, it is possible to obtain an outgoing light characteristic that is excellent in visibility when observing the vicinity of both end portions from the center portion, and therefore, it is advantageous in terms of forming a light source device that achieves a high-quality high luminance over to the end portions. Therefore, the light diffuser 6 is required to have a light diffusion property enabling a wide viewing angle, and the full width half maximum of the outgoing light luminous intensity distribution is preferably in the range of 0.7 to 13 degrees, more preferably 1 to 11 degrees, and further preferably 2 to 9 degrees. Further, the haze value is preferably in the range of 30 to 82%, more preferably 35 to 75%, and further preferably 40 to 70%. Furthermore, when the convex-concave structure is formed on the surface of the light diffuser 6, the average inclination angle thereof is preferably in the range of 0.8 to 12 degrees, more preferably 1 to 8.5 degrees, and further preferably 1.5 to 7 degrees.

Particularly, when the developed length of the light guide 3 is greater than 22 cm and equal to or less than 28 cm, use is preferably made of, as the light diffuser 6, one that is configured in such a manner that the full width half maximum of the outgoing light luminous intensity distribution is in the range of 6 to 13 degrees, more preferably 7 to 11 degrees, and further preferably 7 to 9 degrees. Further, the haze value is preferably in the range of 50 to 82%, more preferably 60 to 75%, and further preferably 65 to 70%. Furthermore, when the convex-concave structure is formed on the surface of the light diffuser 6, the average inclination angle thereof is preferably in the range of 4.5 to 12 degrees, more preferably 5.5 to 8.5 degrees, and further preferably 6 to 7 degrees.

Further, when the developed length of the light guide 3 is greater than 8 cm and equal to or less than 22 cm, use is preferably made of, as the light diffuser 6, one that is configured in such a manner that the full width half maximum of the outgoing light luminous intensity distribution is in the range of 0.7 to 6 degrees, more preferably 1 to 5 degrees, and further preferably 2 to 4 degrees. Further, the haze value is preferably in the range of 30 to 60%, more preferably 35 to 55%, and further preferably 40 to 50%. Furthermore, when the convex-concave structure is formed on the surface of the light diffuser 6, the average inclination angle thereof is preferably in the range of 0.8 to 6 degrees, more preferably 1 to 5 degrees, and further preferably 1.5 to 4.5 degrees.

In the light source device of the present invention, when using the foregoing light diffuser 6, there is an instance where it is preferable in terms of improvement in luminance to use the light deflector 4 having a relatively low light condensing property such that the full width half maximum of the outgoing light luminance distribution (in the XZ-plane) of the light from the light deflector 4 is about 19 to 26 degrees, and to use the light diffuser 6 having a relatively low light diffusion property because this can suppress reduction in luminance caused by diffusion in the YZ-plane. In this case, the light diffuser 6 is required to have a light diffusion property enabling a wide viewing angle, and the full width half maximum of the outgoing light luminous intensity distribution is preferably in the range of 1 to 8 degrees, more preferably 2 to 8 degrees, and further preferably 3 to 7 degrees. Further, the haze value is preferably in the range of 8 to 70%, more preferably 30 to 65%, and further preferably 40 to 60%. Furthermore, when the convex-concave structure is formed on one of the surfaces of the light diffuser 6, the average inclination angle thereof is preferably in the range of 0.8 to 7 degrees, more preferably 3 to 6.5 degrees, and further preferably 3.5 to 6 degrees. When the convex-concave structure is formed on both surfaces, the average inclination angle thereof on one of the surfaces is preferably in the range of 0.8 to 4 degrees, more preferably 1 to 4 degrees, and further preferably 2 to 4 degrees.

Figure 7:
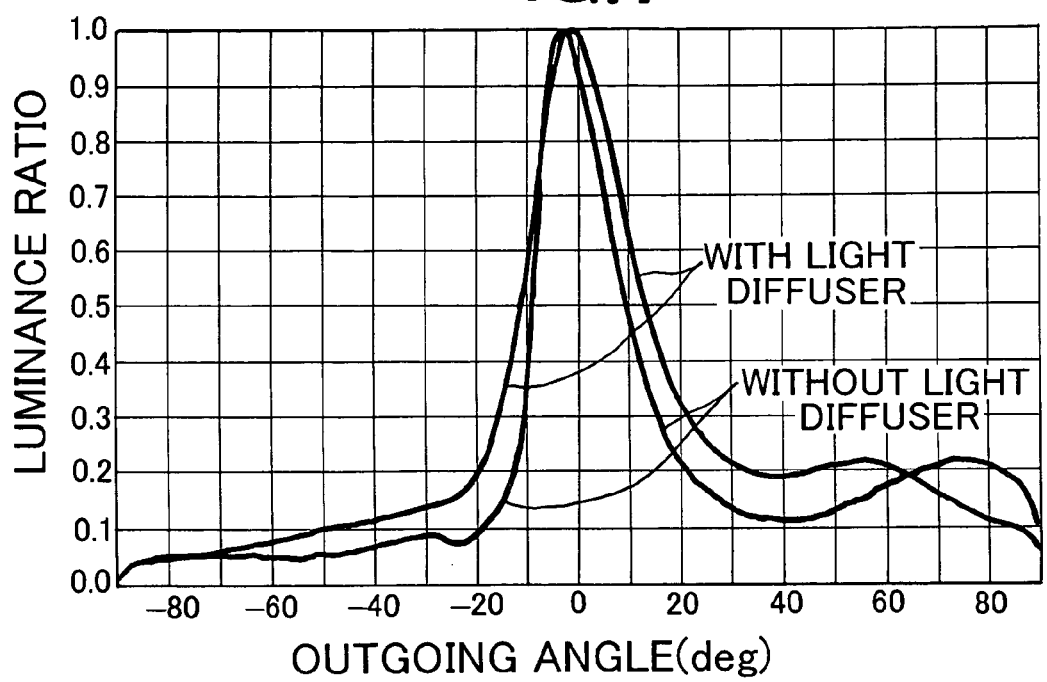
FIG. 7 is a graph showing a luminance distribution (in the XZ-plane) of outgoing light from the light deflector of the light source device of the present invention.

In the light source device of the present invention, there is an instance where the outgoing light exiting from the light exit surface of the light deflector 4 forms an asymmetric outgoing light luminance distribution (in the XZ-plane: "without light diffuser") as shown in FIG. 7. This outgoing light luminance distribution (in the XZ-plane) is resulted from the outgoing light luminous intensity distribution (in the XZ-plane) of the light emitted from the light guide 3. Such an asymmetric outgoing light luminance distribution (in the XZ-plane) tends to be formed when, for example, outgoing light with a high directivity exits from the light deflector 4 in such a manner that the full width half maximum of the luminance distribution (in the XZ-plane) of the outgoing light from the light deflector 4 is 20 degrees or less. Particularly, in the light source device having a relatively large display area, it is necessary to use the light diffuser 6 having a relatively high light diffusion property for relaxing the asymmetry of such an outgoing light luminance distribution (in the XZ-plane) (FIG. 7 shows an outgoing light luminance distribution when such a light diffuser is used ("with light diffuser")). On the other hand, when use is made of, as the light diffuser 6, one wherein the full width half maximum of the outgoing light luminous intensity distribution is 4 degrees or more and the haze value is 35% or more, it is possible that the peak angle of the luminance distribution (in the XZ-plane) of the outgoing light exiting from the light diffuser 6 is deflected relative to the peak angle of the luminance distribution (in the XZ-plane) of the outgoing light from the light deflector 4 by about 1 to 3 degrees in a direction away from the primary light source. In this case, when the peak angle of the luminance distribution (in the XZ-plane) of the outgoing light from the light deflector is in a desired direction (e.g. the normal direction), usage of the light diffuser 6 causes reduction in luminance in the desired direction. Therefore, when using the foregoing light diffuser 6 in case where the full width half maximum of the luminance distribution (in the XZ-plane) of the outgoing light from the light deflector 4 is 20 degrees or less, it is preferable to design the light deflector 4 or the like in advance such that, as shown in FIG. 7, the peak angle of the luminance distribution (in the XZ-plane) of the outgoing light from the light deflector 4 is inclined toward the light source side from the desired direction by 0.5 to 3 degrees, more preferably 0.5 to 2 degrees, and further preferably 1 to 2 degrees.

Figure 8:
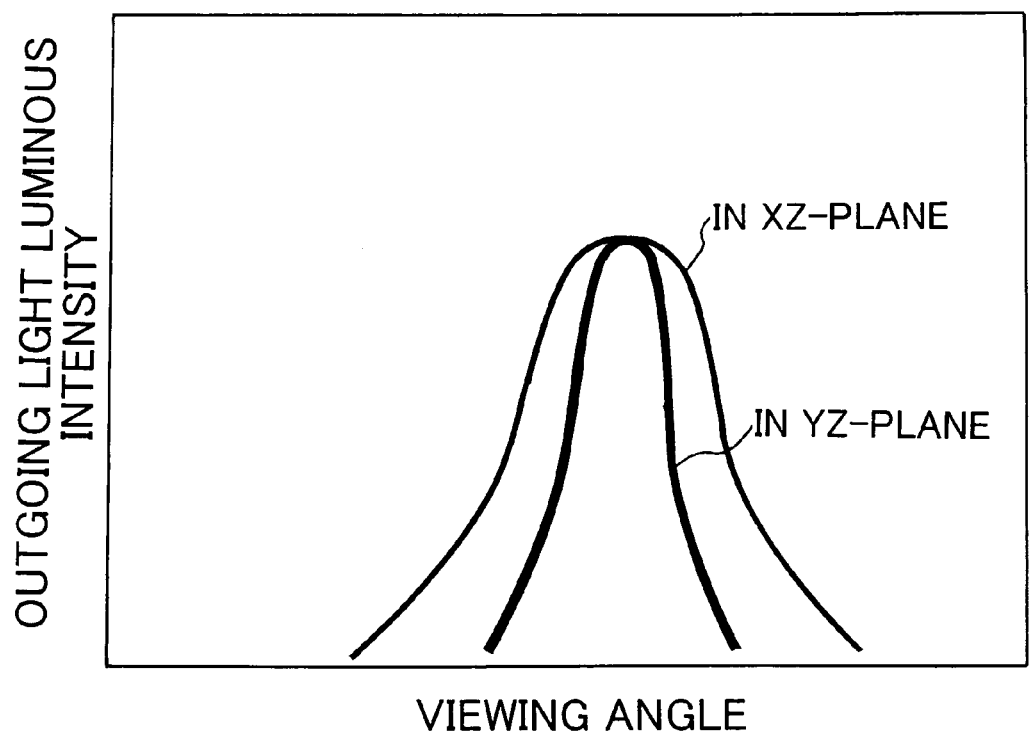
FIG. 8 is an explanatory diagram showing an outgoing light luminous intensity distribution of the light diffuser having an anisotropic diffusion property of the present invention.

In the present invention, it is preferable to use, as the light diffuser 6, one that has an anisotropy in its light diffusion property because it can increase the whole light ray transmissivity of the light diffuser 6, efficiently diffuse the outgoing light from the light deflector 4, and improve the luminance. For example, in the light source device having the linear cold-cathode tube disposed as the primary light source 1 facing one end surface of the light guide 3, the outgoing light exiting from the light outgoing surface of the light guide 3 is subjected mainly to visual field narrowing in the XZ-plane by the light deflector 4, and the light having been subjected to visual field narrowing in the XZ-plane is further subjected mainly to diffusion by the light diffuser 6 to thereby broaden the viewing angle. However, if use is made of, as the light diffuser 6, one that has an isotropic diffusion property, the light is diffused equally even in the YZ-plane where visual field narrowing by the light deflector is not carried out, so that reduction in luminance is caused. Therefore, as shown in FIG. 8, by using the light diffuser 6 having an anisotropic diffusion property that exhibits a higher light diffusion property in the XZ-plane than in the YZ-plane, diffusion of the light in the XZ-plane subjected to visual field narrowing by the light deflector can be made strong while diffusion of the light in the YZ-plane not subjected to visual field narrowing can be made weak, so that the outgoing light from the light deflector 4 can be efficiently diffused to thereby minimize reduction in luminance.

Figure 9:
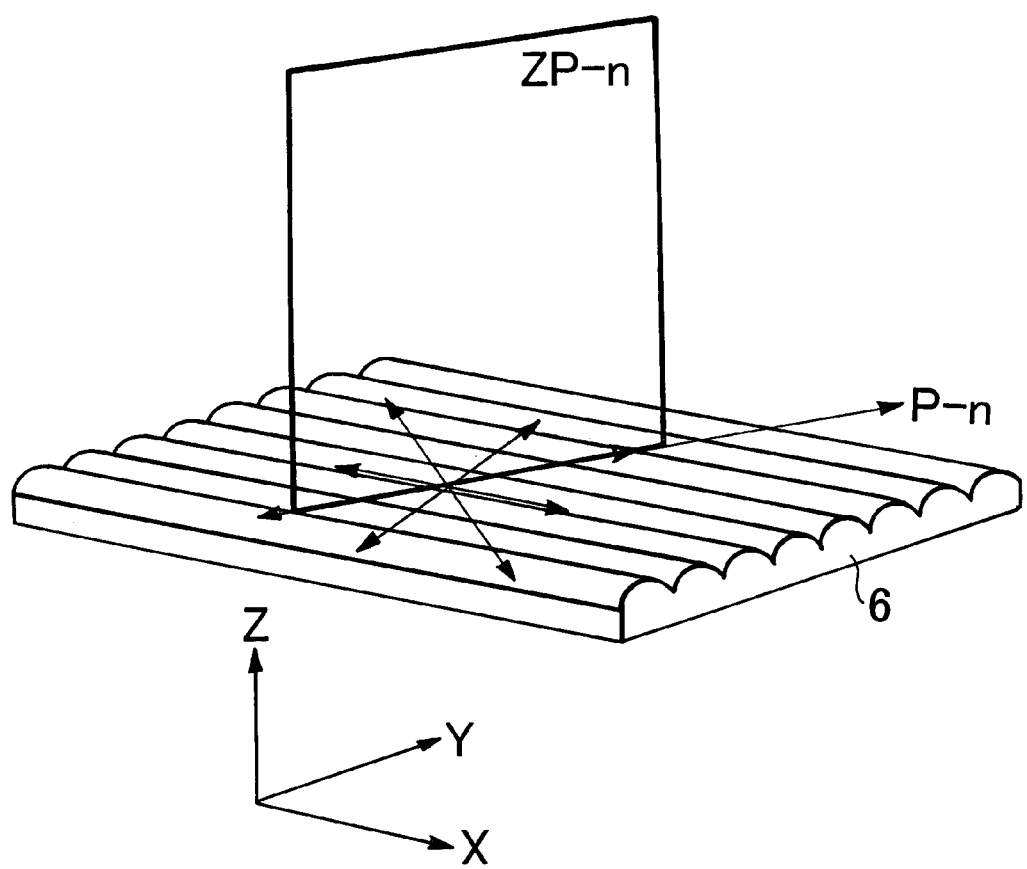
FIG. 9 is an explanatory diagram of an anisotropic diffusion property of the light diffuser of the present invention.

In the present invention, with respect to the anisotropic diffusion property of the light diffuser 6, determination on what anisotropy is required for the light diffuser 6 is not made only based on the anisotropy in the XZ-plane and YZ-plane as described above, but it can be suitably selected depending on the shape of the light emitting function portion of the light guide 3, the lens shape and arrangement of the light deflector 4, applied use of the light source device, and so forth. Specifically, as shown in FIG. 9, the anisotropy can be provided by assuming arbitrary planes (ZP-n planes (n=1,2, . . . )) including normal axes relative to the outgoing surface of the light diffuser 6 and arbitrary directions (P-n directions (n=1,2, . . . )) in the outgoing surface of the light diffuser 6, and by causing full width half maximums of outgoing light luminance distributions in these arbitrary planes to differ from each other. Note that the maximum value among the full width half maximums of the ZP-n planes is given as a maximum full width half maximum, and the minimum value among them is given as a minimum full width half maximum. Likewise, with respect to the average inclination angle of the convex-concave structure giving the anisotropic diffusion property to the light diffuser 6, the anisotropy of the average inclination angle can be provided by causing average inclination angles in arbitrary P-n directions where the ZP-n planes and the light diffuser 6 (XY-plane) intersect each other, to differ from each other. In this event, the maximum value among the average inclination angles in the P-n directions is given as a maximum average inclination angle, and the minimum value among them is given as a minimum average inclination angle.

For example, when the linear cold-cathode tube is disposed facing one end surface of the light guide 3 to serve as the primary light source 1, since the light deflector 4 achieves visual field narrowing mainly in the XZ-plane while it hardly acts in the YZ-plane, it is optimal to use the light diffuser 6 having an anisotropic diffusion property that effectively diffuses the outgoing light from the light deflector 4 in the XZ-plane while does not diffuse it in the YZ-plane. Therefore, it is preferable that the light diffuser 6 have such an anisotropic diffusion property that exhibits the maximum full width half maximum in the XZ-plane and the minimum full width half maximum in the YZ-plane. Likewise, it is preferable that the convex-concave structure formed on the light diffuser 6 be configured or arranged to have the maximum average inclination angle in the X-direction and the minimum average inclination angle in the Y-direction.

Even in case of the light diffuser 6 having such an anisotropic diffusion property, it is preferable that the light diffuser 6 has a light diffusion property that suitably diffuses the outgoing light from the light deflector 4, taking into account the balance among the luminance characteristic, visibility, quality, and so forth. Specifically, when the light diffusion property of the light diffuser 6 is low, there is a tendency that it becomes difficult to sufficiently broaden the viewing angle to thereby lower the visibility, and the quality improving effect becomes insufficient. Conversely, when the light diffusion property is too high, there is a tendency that the effect of visual field narrowing by the light deflector 4 is spoiled and the whole light ray transmissivity is also reduced to lower the luminance. In view of this, use is made of the light diffuser wherein the maximum full width half maximum of the outgoing light luminous intensity distribution is in the range of 1 to 13 degrees, preferably 3 to 11 degrees, and more preferably 4 to 9 degrees. Further, the ratio (maximum full width half maximum/minimum full width half maximum) of the maximum full width half maximum relative to the minimum full width half maximum is preferably in the range of 1.1 to 20, more preferably 2 to 15, and further preferably 4 to 10. This is because the light utilization efficiency can be improved to increase the luminance by setting maximum full width half maximum/minimum full width half maximum to 1.1 or more, while, it is possible to suppress reduction in luminance caused by the strong light diffusion property by setting it to 20 or less.

When forming the convex-concave structure on one of the surfaces of the light diffuser 6, the maximum average inclination angle thereof is preferably set in the range of 0.8 to 15 degrees, more preferably 3.5 to 11 degrees, and further preferably 4 to 9 degrees. Further, from the aspect of the anisotropy like maximum full width half maximum/minimum full width half maximum, the ratio (maximum average inclination angle/minimum average inclination angle) of the maximum average inclination angle relative to the minimum average inclination angle is preferably in the range of 1.1 to 20, more preferably 2 to 15, and further preferably 4 to 10. The convex-concave structure may be formed on both surfaces of the light diffuser 6. In this case, it is preferable that the average inclination angle on the incident surface side of the light diffuser 6 be set greater than the average inclination angle on the outgoing surface side thereof for suppressing reduction of the whole light ray transmissivity of the light diffuser 6. Further, in terms of improving the luminance characteristic and visibility, the haze value of the light diffuser 6 is preferably set in the range of 8 to 82%, more preferably 30 to 70%, and further preferably 40 to 65%.

It is preferable to use the light diffuser 6 having a suitable light diffusion property depending on the size of the display area of the light source device. In case of the developed length of the light guide 3 being 8 cm or less, for the light diffuser 6, the maximum full width half maximum of the outgoing light luminous intensity distribution is preferably in the range of 1 to 6 degrees, more preferably 1 to 5 degrees, and further preferably 2 to 5 degrees. Further, the haze value is preferably in the range of 8 to 60%, more preferably 8 to 50%, and further preferably 20 to 50%. Furthermore, when the convex-concave structure is formed on the surface of the light diffuser 6, the maximum average inclination angle thereof is preferably in the range of 0.8 to 5 degrees, more preferably 0.8 to 4 degrees, and further preferably 2 to 4 degrees.

In case of the developed length of the light guide 3 being greater than 8 cm and equal to or less than 23 cm (one-lamp type cold-cathode tube is used as the primary light source 1), for the light diffuser 6, the maximum full width half maximum of the outgoing light luminous intensity distribution is preferably in the range of 3 to 13 degrees, more preferably 4 to 10 degrees, and further preferably 4 to 9 degrees. Further, the haze value is preferably in the range of 30 to 80%, more preferably 40 to 73%, and further preferably 45 to 70%. Furthermore, when the convex-concave structure is formed on the surface of the light diffuser 6, the maximum average inclination angle thereof is preferably in the range of 3 to 15 degrees, more preferably 3.5 to 10 degrees, and further preferably 4.5 to 8 degrees. Particularly, when the developed length of the light guide 3 is greater than 8 cm and equal to or less than 18 cm, for the light diffuser 6, the maximum full width half maximum of the outgoing light luminous intensity distribution is preferably in the range of 3 to 10 degrees, more preferably 4 to 10 degrees, and further preferably 4 to 9 degrees. Further, the haze value is preferably in the range of 30 to 70%, more preferably 40 to 65%, and further preferably 45 to 60%. Furthermore, when the convex-concave structure is formed on the surface of the light diffuser 6, the maximum average inclination angle thereof is preferably in the range of 3 to 9 degrees, more preferably 3.5 to 8 degrees, and further preferably 4.5 to 8 degrees. On the other hand, when the developed length of the light guide 3 is greater than 18 cm and equal to or less than 22 cm, for the light diffuser 6, the maximum full width half maximum of the outgoing light luminous intensity distribution is preferably in the range of 4 to 13 degrees, more preferably 5 to 11 degrees, and further preferably 5 to 8.5 degrees. Further, the haze value is preferably in the range of 40 to 75%, more preferably 50 to 70%, and further preferably 50 to 65%. Furthermore, when the convex-concave structure is formed on the surface of the light diffuser 6, the maximum average inclination angle thereof is preferably in the range of 3.5 to 15 degrees, more preferably 4 to 9 degrees, and further preferably 4.5 to 6.5 degrees. Further, when the developed length of the light guide 3 is greater than 22 cm and equal to or less than 23 cm, use is preferably made of, as the light diffuser 6, one that is configured in such a manner that the maximum full width half maximum of the outgoing light intensity distribution is in the range of 5 to 13 degrees, more preferably 6 to 12 degrees, and further preferably 7 to 9 degrees. Further, the haze value is preferably in the range of 50 to 80%, more preferably 55 to 73%, and further preferably 55 to 70%. Furthermore, when the convex-concave structure is formed on the surface of the light diffuser 6, the maximum average inclination angle thereof is preferably in the range of 4.5 to 15 degrees, more preferably 5 to 10 degrees, and further preferably 5 to 7 degrees.

In case of the developed length of the light guide 3 being greater than 8 cm and equal to or less than 28 cm (multi-lamp type cold-cathode tubes are used as primary light sources 1), the light diffuser 6 is required to have a light diffusion property enabling a wide viewing angle, and the maximum full width half maximum of the outgoing light luminous intensity distribution thereof is preferably in the range of 0.7 to 13 degrees, more preferably 1 to 11 degrees, and further preferably 2 to 9 degrees. Further, the haze value is preferably in the range of 30 to 82%, more preferably 35 to 75%, and further preferably 40 to 70%. Furthermore, when the convex-concave structure is formed on the surface of the light diffuser 6, the maximum average inclination angle thereof is preferably in the range of 0.8 to 15 degrees, more preferably 1 to 13 degrees, and further preferably 1.5 to 7 degrees. Particularly, when the developed length of the light guide 3 is greater than 22 cm and equal to or less than 28 cm, use is preferably made of, as the light diffuser 6, one that is configured in such a manner that the maximum full width half maximum of the outgoing light luminous intensity distribution is in the range of 6 to 13 degrees, more preferably 7 to 11 degrees, and further preferably 7 to 9 degrees. Further, the haze value is preferably in the range of 50 to 82%, more preferably 60 to 75%, and further preferably 65 to 70%. Furthermore, when the convex-concave structure is formed on the surface of the light diffuser 6, the maximum average inclination angle thereof is preferably in the range of 4.5 to 15 degrees, more preferably 5.5 to 13 degrees, and further preferably 6 to 7 degrees. Further, when the developed length of the light guide 3 is greater than 8 cm and equal to or less than 22 cm, use is preferably made of, as the light diffuser 6, one that is configured in such a manner that the maximum full width half maximum of the outgoing light intensity distribution is in the range of 0.7 to 6 degrees, more preferably 1 to 5 degrees, and further preferably 2 to 4 degrees. Further, the haze value is preferably in the range of 30 to 60%, more preferably 35 to 55%, and further preferably 40 to 50%. Furthermore, when the convex-concave structure is formed on the surface of the light diffuser 6, the maximum average inclination angle thereof is preferably in the range of 0.8 to 10 degrees, more preferably 1 to 7 degrees, and further preferably 1.5 to 5 degrees.

Figure 10:
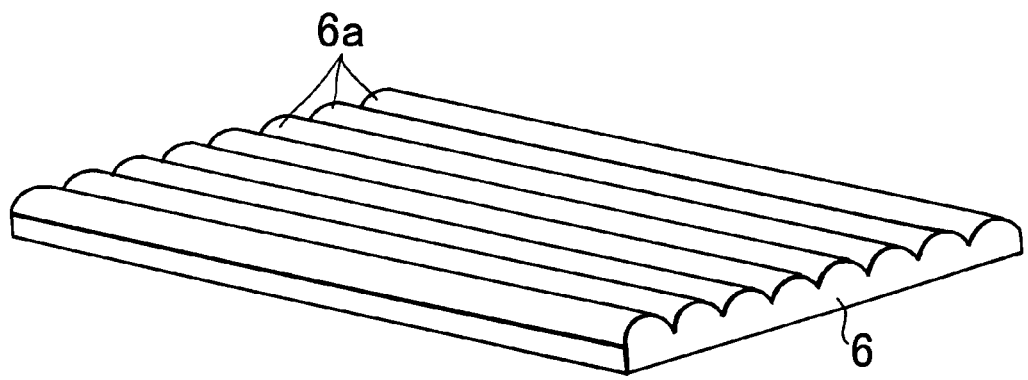
FIG. 10 is a schematic diagram showing a convex-concave structure of the light diffuser having the anisotropic diffusion property of the present invention.
Figure 11:
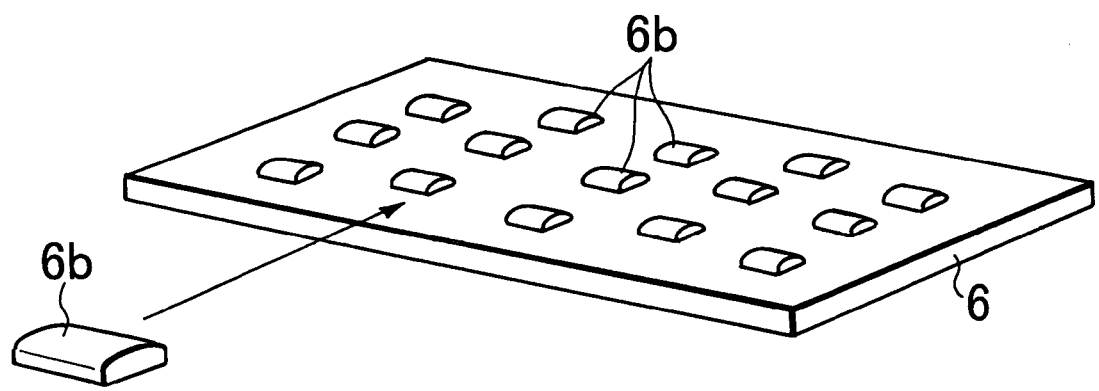
FIG. 11 is a schematic diagram showing a convex-concave structure of the light diffuser having the anisotropic diffusion property of the present invention.
Figure 12:
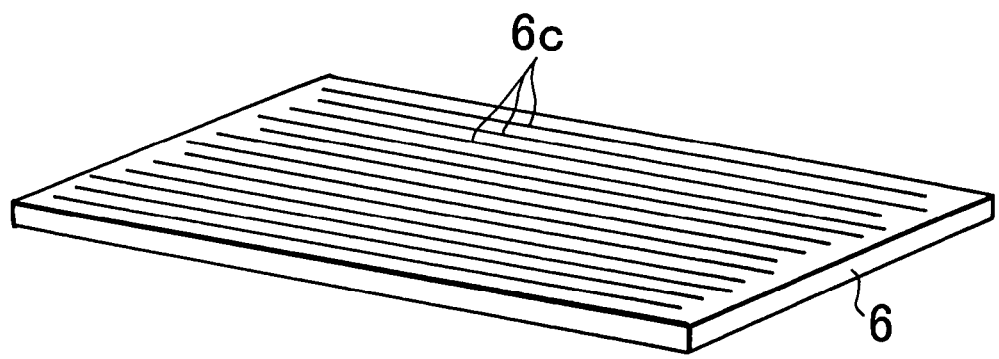
FIG. 12 is a schematic diagram showing a convex-concave structure of the light diffuser having the anisotropic diffusion property of the present invention.

As the diffusion property giving structure of the light diffuser 6 having the anisotropic diffusion property, there can be cited convex-concave structures as illustrated in FIGS. 10 to 12. The convex-concave structure illustrated in FIG. 10 is an array structure having a number of elongated lenses 6a such as elongated lenticular lenses successively arrayed side by side and extending in the same direction. For the arraying pitch of the elongated lenses, it is preferable to select a pitch that is not liable to cause moire relative to the arraying pitch of pixels of the liquid crystal display element used in the display device or relative to the arraying pitch of the elongated lenses such as the elongated prisms of the light deflector 4, or to use random arraying pitches. Typically, the arraying pitch of the elongated lenses is preferably set in the range of 1 to 70 μm, more preferably 5 to 40 μm in terms of facilitating production and preventing occurrence of moire, and further preferably 10 to 30 μm. In terms of improvement in luminance and visibility, the average inclination angle in a direction perpendicular to a longitudinal direction of the elongated lens is preferably set in the range of 0.8 to 15 degrees, more preferably 3.5 to 11 degrees, and further preferably 4 to 9 degrees.

The convex-concave structure illustrated in FIG. 11 is a structure wherein a number of cylindrical lens shaped members 6b are discretely arrayed. The arraying interval of the cylindrical lens shaped members may be a fixed regular pitch or random arraying pitches. Typically, the arraying pitch of the cylindrical lens shaped members is preferably set in the range of 1 to 70 μm, more preferably 5 to 40 μm in terms of facilitating production and preventing occurrence of moire, and further preferably 10 to 30 μm. In terms of improvement in luminance and visibility, the average inclination angle in a direction perpendicular to a longitudinal direction of the cylindrical lens shaped member is preferably set in the range of 0.8 to 15 degrees, more preferably 3.5 to 11 degrees, and further preferably 4 to 9 degrees. Such a discrete array structure is preferably arranged in such a manner that the probability becomes high that a line where the plane for which the maximum full width half maximum is required to be shown and the outgoing surface of the light diffuser 6 intersect each other, and the longitudinal direction of the cylindrical lens shaped member become substantially perpendicular to each other. Further, the structure is preferably arranged in such a manner that the probability becomes high that a line where the plane for which the minimum full width half maximum is required to be shown and the outgoing surface of the light diffuser 6 intersect each other, and the longitudinal direction of the cylindrical lens shaped member become substantially parallel to each other.

The convex-concave structure illustrated in FIG. 12 is a hairline structure. In terms of improvement in luminance and visibility, the average inclination angle in a direction perpendicular to an extending direction of hairlines 6c is preferably set in the range of 0.8 to 15 degrees, more preferably 3.5 to 11 degrees, and further preferably 4 to 9 degrees. The extending direction of the hairline is preferably a direction that is substantially perpendicular to a line where the plane required to represent the maximum full width half maximum for the light diffuser 6 and the outgoing surface of the light diffuser 6 intersect each other.

By applying a mat structure to at least one of the surface formed with such a convex-concave structure giving the anisotropic diffusion property and the back surface thereof, it is possible to suppress glare, luminance spots, and the like to thereby achieve improvement in quality. However, if the light diffusion property of the mat structure becomes strong, the anisotropic diffusion property may be spoiled to cause reduction in luminance. Therefore, it is preferable to apply the mat structure having a relatively weak light diffusion property. For such a mat structure, the average inclination angle is preferably in the range of 0.5 to 5 degrees, more preferably 0.8 to 4 degrees, and further preferably 1 to 3.5 degrees. Note that when the mat structure is applied to the surface of the anisotropy giving convex-concave structure, the average inclination angle of the mat structure represents an average inclination angle of the mat structure itself excluding an average inclination angle caused by the convex-concave structure. Such an average inclination angle can be measured at a portion where the convex-concave structure does not exist, or in a direction parallel to the longitudinal direction of the convex-concave structure. It can be measured using a contact-stylus roughness meter, a method of performing an image analysis of a sectional shape of the light diffuser 6, an atomic force microscope, or the like.

In the present invention, it is also possible to emit the outgoing light from the light guide 3 in a particular direction such as the normal direction by the use of the light deflector 4 and emit this outgoing light in a desired direction by the use of the light diffuser 6 having the anisotropic diffusion property. In this case, it is also possible to give both functions, i.e. an anisotropic diffusion action and a light deflection action, to the light diffuser 6. For example, in case of using the elongated lenticular lenses or the cylindrical lens shaped members as the convex-concave structure, both functions of the anisotropic diffusion action and the light deflection action can be given by forming the sectional shape of the convex-concave structure to be asymmetric.

Further, in the present invention, for the purpose of adjusting the viewing angle of the light source device and improving the quality of the light source, a light diffusion material can be contained in the light deflector 4 or the light diffuser 6. As such a light diffusion material, use can be made of transparent particles having a refractive index different from that of a basic material forming the light deflector 4 or the light diffuser 6. For example, there can be cited of silicone beads, polystyrene, polymethylmethacrylate, homopolymer, copolymer, or the like of fluorinated methacrylate or the like. For the light diffusion material, it is necessary to properly select the content, particle size, refractive index, and the like so as not to spoil the visual field narrowing effect achieved by the light deflector 4 or the proper diffusion effect achieved by the light diffuser 6. For example, if a difference between the refractive index of the light diffusion material and that of the basic material of the light deflector 4 or the light diffuser 6 is too small, the small diffusion effect is resulted, while, if it is too large, excessive scattering and refraction are resulted. Therefore, the refractive index difference is preferably set in the range of 0.01 to 0.1, more preferably 0.03 to 0.08, and further preferably 0.03 to 0.05. Further, when the particle size of the light diffusion material is too large, scattering becomes strong to cause glare or reduction in luminance, while, when it is too small, coloring is generated. Therefore, the average particle size is preferably set in the range of 0.5 to 20 μm, more preferably 2 to 15 μm, and further preferably 2 to 10 μm.

The primary light source 1 is a linear light source extending in the Y-direction. As the primary light source 1, a fluorescent lamp or a cold-cathode tube, for example, can be used. In the present invention, the primary light source 1 is not limited to the linear light source, but use can also be made of a point light source such as an LED light source, a halogen lamp, a metal halide lamp. Particularly, when used in a display device with a relatively small screen size such as a portable telephone, a portable information terminal, or the like, it is preferable to use the point light source such as the LED. Further, as illustrated in FIG. 1, not only the primary light source 1 is disposed facing one side end surface of the light guide 3, but also another primary light source can be disposed facing another side end surface on the opposite side depending on necessity.

The light source reflector 2 serves to guide the light of the primary light source 1 to the light guide 3 with a small loss. As a material thereof, use can be made of, for example, a plastic film having a metal-deposited reflection layer on the surface. As illustrated, the light source reflector 2 is wound on the primary light source 1 so as to extend from an outer surface of an edge portion of the light reflector 5 via an outer periphery of the primary light source 1 to an edge portion of the outgoing surface of the light diffuser 6. On the other hand, avoiding the light diffuser 6, the light source reflector 2 may extend from the outer surface of the edge portion of the light reflector 5 via the outer periphery of the primary light source 1 to an edge portion of the light exit surface of the light deflector 4, or, further avoiding the light deflector 4, the light source reflector 2 may extend from the outer surface of the edge portion of the light reflector 5 via the outer periphery of the primary light source 1 to an edge portion of the light outgoing surface of the light guide 3.

A reflection member like such a light source reflector 2 can also be provided at a side end surface of the light guide 3 other than the side end surface 31. As the light reflector 5, use can be made of, for example, a plastic sheet having a metal-deposited reflection layer on the surface. In the present invention, instead of the reflection sheet, the light reflector 5 can be in the form of a light reflection layer formed on the back surface 34 of the light guide 3 by metal deposition or the like.

The light guide 3, the light deflector 4, and the light diffuser 6 of the present invention can be made of a synthetic resin having a high light transmissivity. Such a synthetic resin can be exemplified by a methacrylic resin, acrylic resin, polycarbonate-based resin, polyester-based resin, or polyvinyl chloride-based resin. Particularly, the methacrylic resin is excellent in light transmissivity, heat resistance, mechanical property, and moldability, and is optimum. Such a methacrylic resin is a resin containing methyl methacrylate as a main component, preferably at 80 weight % or more. The roughened surface, the surface structure of the hairlines or the like, or the surface structure of the elongated prisms, the elongated lenticular lenses, or the like of the light guide 3, the light deflector 4, or the light diffuser 6 may be formed by heat-pressing a transparent synthetic resin plate using a die member having a desired surface structure, or by screen printing, extrusion molding, injection molding, or the like wherein the shape is given simultaneously with molding. Further, the structural surface can be formed by using a thermosetting or photocuring resin or the like. Further, a roughened surface structure or an elongated lens array structure made of an active energy ray curing resin may be formed on a transparent base member such as a transparent film or sheet made of a polyester-based resin, acrylic resin, polycarbonate-based resin, polyvinyl chloride-based resin, polymethacrylicimide-based resin, or the like, or such a sheet may be integrally joined to a separate transparent base member by a method of bonding, fusion, or the like. As the active energy ray curing resin, use can be made of multi-functional (metha) acrylic compound, vinyl compound, (metha) acrylic ester, allyl compound, metal salt of (metha) acrylic acid, or the like.

By disposing the liquid crystal display element on the light-emitting surface (the outgoing surface 62 of the light diffuser 6) of the light source device comprising the primary light source 1, the light source reflector 2, the light guide 3, the light deflector 4, the light diffuser 6, and the light reflector 5, there is formed a liquid crystal display device using the light source device of the present invention as a backlight. The liquid crystal display device is observed by a viewer from above in FIG. 1 through the liquid crystal display element. Further, in the present invention, since the fully collimated light with a narrow luminance distribution (in the XZ-plane) can be incident on the liquid crystal display element from the light source device, an image display excellent in uniformity of brightness and hue without gradation inversion or the like can be obtained at the liquid crystal display element, and further, light irradiation converging in a desired direction can be obtained, so that it is possible to enhance the utilization efficiency of the quantity of light emitted from the primary light source 1 with respect to illumination of this direction.

The description has been given about the surface light source device in the foregoing embodiments. However, the present invention is also applicable to a rod-shape light source device that is elongated in the X-direction wherein a dimension in the Y-direction is, for example, 5 times the thickness of the light guide 3 or less. In this case, as the primary light source 1, use can be made of a substantially point-shaped light source such as an LED.

Hereinbelow, the present invention will be described concretely using examples.

Measurement of respective characteristic values in the following examples was implemented in the following manner.

Measurement of Normal Luminance and Light Luminous Intensity

Full Width Half Maximum of Surface Light Source Device

A cold-cathode tube was used as a primary light source, and DC12V was applied to an inverter (HIU-742A produced by Harison Corporation) of a drive circuit to light the cold-cathode tube at high frequency. The normal luminance was derived by determining 3×5-divided 15 square areas, each having a side of 20 mm, on the surface of a surface light source device or a light guide, and averaging 15 luminance values in the normal direction of the respective squares. With respect to measurement of the luminous intensity full width half maximum of the light guide, a black paper having a pinhole with a diameter of 4 mm was fixed to the surface of the light guide in such a manner that the pinhole is located at the center of the surface of the light guide, the distance was adjusted so that a measurement circle of a luminance meter became 8 to 9 mm, then an adjustment was carried out so that the rotation shaft of a goniometer was rotated about the pinhole in a perpendicular direction and a parallel direction relative to a longitudinal direction axis of the cold-cathode tube. While rotating the rotation shaft at intervals of one degree from +80 degrees to −80 degrees in the respective directions, a luminous intensity distribution (in the XZ-plane) of outgoing light was measured by the luminance meter to thereby derive a peak angle and a full width half maximum (a spread angle of a distribution (in the XZ-plane) of half or greater values relative to a peak value). With respect to measurement of the luminance full width half maximum of the surface light source device, the viewing angle of the luminance meter was set to 0.1 degrees, and an adjustment was implemented so that the rotation shaft of the goniometer was rotated with the center of a light-emitting surface of the surface light source device as a measurement position. While rotating the rotation shaft at intervals of one degree from +80 degrees to −80 degrees in the respective directions, a luminance distribution (in the XZ-plane) of outgoing light was measured by the luminance meter to thereby derive a peak luminance and a full width half maximum (a spread angle of a distribution (in the XZ-plane) of half or greater values relative to a peak value).

Measurement of Average Inclination Angle (θa)

Pursuant to ISO4287/1-1987, the surface roughness of a roughened surface was measured at a driving speed of 0.03 mm/sec by the use of a contact-stylus type surface roughness meter (Surfcom 570A produced by Tokyo Seiki K.K.) employing 010-2528 (1 μmR, 55° circular cone, diamond) as a stylus. From a chart obtained by this measurement, an inclination was corrected by subtracting an average line, and the average inclination angle was calculated according to the foregoing equations (1) and (2).

Measurement of Haze Value

From a whole light ray transmissivity (Tt) and a diffused light ray transmissivity (Td) obtained according to the method B of JIS K-7105 by using a sample of 50 mm×50 mm and an integrating sphere type reflection transmissivity meter (RT-100-Type produced by Murakami Color Research Laboratory), the haze value was calculated by the following equation (6).

$$\text{Haze Value (\%)} = Td/Tt \quad (6)$$

Measurement of Full Width Half Maximum of Outgoing Light

Luminous Intensity Distribution of Light Diffuser

With respect to a sample of 50 mm×50 mm, measurement was carried out using an automatic variable angle photometer (GP-200-Type produced by Murakami Color Research Laboratory), and twice a half width half maximum angle that was a spread angle of a distribution of half or greater values relative to a derived peak luminous intensity was given as a full width half maximum angle (α). Light from the light source was condensed to the pinhole by a condenser lens, then formed into parallel light (degree of parallelization: ±0.5 or less) via a collimator lens, then was incident on an incident surface of the sample via a diaphragm (aperture diameter: 10.5 mm). The light transmitted through the sample passed through a light receiving lens (aperture diameter: 11.4 mm) (when the surface of the sample was smooth, the light was condensed to a position of a light-receiving diaphragm), then passed through the light-receiving diaphragm to reach a light-receiving element so as to be outputted as a voltage value. Then, the sample was rotated to carry out the same measurement, thereby deriving a maximum full width half maximum (Maxα) and a minimum full width half maximum (Minα).

EXAMPLE 1

Using an acrylic resin (Acrypet VH5#000 produced by Mitsubishi Rayon Co., Ltd.), a light guide having one principal surface in the form of a mat surface was prepared by injection molding. The light guide had a wedge-plate shape having a size of 216 mm×290 mm with thicknesses 2.0 mm–0.7 mm. On a mirror finished surface of this light guide was formed a prism layer made of an acrylic ultraviolet curing resin and having elongated prisms successively arrayed side by side at a pitch of 50 μm and with a prism vertical angle of 130 degrees and each extending in parallel to a side of 216 mm (short side) of the light guide. A cold-cathode tube was disposed along a side of 290 mm (long side) of the light guide so as to face one side end surface (end surface on the side with the thickness 2.0 mm) corresponding to the long side of the light guide, while the cold-cathode tube was covered with a light source reflector (silver reflection film produced by Reikosha). Further, light diffusion reflection films (E60 produced by Toray Industries, Inc.) were stuck to the other side end surfaces, and a reflection sheet was disposed facing the surface (back surface) of the elongated prism array. The foregoing structure was incorporated into a frame body. With respect to this light guide, the maximum peak of an outgoing light luminous intensity distribution (in the XZ-plane) was 70 degrees relative to the normal direction of the light outgoing surface, and the full width half maximum was 22.5 degrees.

On the other hand, using an acrylic ultraviolet curing resin having a refractive index of 1.5064, a prism sheet was prepared wherein elongated prisms were formed on one surface of a polyester film having a thickness of 125 μm. The elongated prisms were in the form of a number of elongated prisms successively arrayed side by side at a pitch of 50 μm, wherein one prism surface had a convex curved surface shape having a radius of curvature of 1000 μm, while the other prism surface had a flat shape. In this event, as virtual elongated prisms, elongated prisms each having an isosceles triangular shape in section with a vertical angle of 65.4 degrees were disposed at a pitch of 50 μm such that outgoing light from the prism sheet is oriented in the normal direction of its light exit surface.

The obtained prism sheet was placed in such a manner that the elongated prism formed surface was oriented toward the light outgoing surface (mat surface) side of the foregoing light guide, ridgelines of the elongated prisms were in parallel to the light incident surface of the light guide, and the flat-shaped prism surface of each elongated prism was oriented toward the light incident surface of the light guide.

Further, a light diffuser having one surface in the form of a mat surface with an average inclination angle of 3.37 degrees and the other surface in the form of a mat surface with an average inclination angle of 0.7 degrees and having a full width half maximum of an outgoing light luminous intensity distribution of 4 degrees and a haze value of 37.35% was placed on the light exit surface of the light deflector so that the mat surface with the average inclination angle of 3.37 degrees was oriented toward the light deflector side, thereby obtain a surface light source device. The intensity ratio of the peak luminance (luminance ratio using a value of later-described Comparative Example 1 as a reference) of the produced surface light source device and the full width half maximum of an outgoing light luminance distribution (in the XZ-plane) in the plane perpendicular to the cold-cathode tube were derived, and a result thereof is shown in Table 1.

EXAMPLE 2

A prism sheet having one surface formed with elongated prisms at a pitch of 50 μm and with a vertical angle of 65.4 was prepared like in Example 1 except that a prism surface forming the elongated prism and located on the side closer to the primary light source was formed flat, while a prism surface forming the elongated prism and located on the side farther from the primary light source was formed into a flat shape in a region (region in the vicinity of a top portion of the elongated prism) at a height of the elongated prism being 16 μm or more, while formed into a convex curved surface shape with a radius of curvature of 400 μm in a region (region in the vicinity of a bottom portion of the elongated prism) at a height being less than 16 μm (inclination angle of a plane extending through a boundary line between the flat shape region and the convex curved surface shape region, and a bottom portion of the prism surface was set to 30 degrees relative to a normal of the prism sheet).

This prism sheet was placed in such a manner that the elongated prism formed surface was oriented toward the light outgoing surface side of the light guide obtained in Example 1, and prism ridgelines were in parallel to the light incident surface of the light guide. In this case, the position K2 of the virtual prism surface corresponds to a position of the elongated prism at a height of 27 μm.

Further, a light diffuser having one surface in the form of a mat surface with an average inclination angle of 7.27 degrees and the other surface in the form of a mat surface with an average inclination angle of 0.7 degrees and having a full width half maximum of an outgoing light luminous intensity distribution of 9.4 degrees and a haze value of 73.60% was placed on the light exit surface of the light deflector so that the mat surface with the average inclination angle of 7.27 degrees was oriented toward the light deflector side, thereby obtain a surface light source device. The intensity ratio of the peak luminance of the produced surface light source device and the full width half maximum of an outgoing light luminance distribution (in the XZ-plane) in the plane perpendicular to the cold-cathode tube were derived, and a result thereof is shown in Table 1.

EXAMPLE 3

A surface light source device was obtained like in Example 2 except that a light diffuser having one surface in the form of a mat surface with an average inclination angle of 5.0 degrees and the other surface in the form of a mat surface with an average inclination angle of 0.7 degrees and having a full width half maximum of an outgoing light luminous intensity distribution of 6 degrees and a haze value of 58.25% was placed on the light exit surface of the light deflector so that the mat surface with the average inclination angle of 5.0 degrees was oriented toward the light deflector side. The intensity ratio of the peak luminance of the produced surface light source device and the full width half maximum of an outgoing light luminance distribution (in the XZ-plane) in the plane perpendicular to the cold-cathode tube were derived, and a result thereof is shown in Table 1.

EXAMPLE 4

A surface light source device was obtained like in Example 2 except that a light diffuser wherein a polyester film having a thickness of 125 μm had one surface formed with a lens array structure in which a number of elongated lenticular lenses were successively arrayed side by side at a pitch of 30 μm and the surface of the elongated lenticular lenses was roughened to an average inclination angle of 1 degree with a maximum average inclination angle of 10.4 degrees and with maximum average inclination angle/minimum average inclination angle being 10.4, and the other surface formed with a mat surface having an average inclination angle of 0.7 degrees, the full width half maximum of an outgoing light luminous intensity distribution was 11.2 degrees, and the haze value was 64.70%, was placed in such a manner that the elongated lenticular lenses were in parallel to the elongated prisms of the light deflector and the surface of the lens array structure was oriented toward the light deflector side. The intensity ratio of the peak luminance of the produced surface light source device and the full width half maximum of an outgoing light luminance distribution (in the XZ-plane) in the plane perpendicular to the cold-cathode tube were derived, and a result thereof is shown in Table 1.

EXAMPLE 5

A surface light source device was obtained like in Example 2 except that a light diffuser wherein a polyester film having a thickness of 125 μm had one surface formed with hairlines having a maximum average inclination angle of 8.2 degrees, and the other surface formed with a mat surface having an average inclination angle of 0.7 degrees, the full width half maximum of an outgoing light luminous intensity distribution was 10.5 degrees, and the haze value was 62.0%, was placed in such a manner that the direction of the hairlines was substantially in parallel to the elongated prisms of the light deflector and the hairline formed surface was oriented toward the light deflector side. The intensity ratio of the peak luminance of the produced surface light source device and the full width half maximum of an outgoing light luminance distribution (in the XZ-plane) in the plane perpendicular to the cold-cathode tube were derived, and a result thereof is shown in Table 1.

EXAMPLE 6

A surface light source device was obtained like in Example 2 except that a light diffuser wherein a polyester film having a thickness of 125 µm had one surface formed with, by etching, a lens array structure in which a number of cylindrical lens shaped members each having a width of 30 µm and a length of 60 µm were discretely arrayed in the same direction, a maximum average inclination angle was 6.0 degrees, and maximum average inclination angle/minimum average inclination angle was 6.0, and the other surface formed with a mat surface having an average inclination angle of 0.7 degrees, the full width half maximum of an outgoing light luminous intensity distribution was 7.0 degrees, and the haze value was 55.0%, was placed in such a manner that the direction of the cylindrical lens shaped members and the elongated prisms of the light deflector were substantially in parallel to each other and the surface of the lens array structure was oriented toward the light deflector side. The intensity ratio of the peak luminance of the produced surface light source device and the full width half maximum of an outgoing light luminance distribution (in the XZ-plane) in the plane perpendicular to the cold-cathode tube were derived, and a result thereof is shown in Table 1.

COMPARATIVE EXAMPLE 1

A surface light source device was obtained like in Example 1 except that use was made of a prism sheet in which both prism surfaces of each elongated prism were formed flat and the light diffuser was not used. The intensity ratio of the peak luminance of the produced surface light source device and the full width half maximum of an outgoing light luminance distribution (in the XZ-plane) in the plane perpendicular to the cold-cathode tube were derived, and a result thereof is shown in Table 1.

COMPARATIVE EXAMPLE 2

A surface light source device was obtained like in Example 1 except that the light diffuser was not used. The intensity ratio of the peak luminance of the produced surface light source device and the full width half maximum of an outgoing light luminance distribution (in the XZ-plane) in the plane perpendicular to the cold-cathode tube were derived, and a result thereof is shown in Table 1.

TABLE 1

| | Light Diffuser | | | | |
| --- | --- | --- | --- | --- | --- |
| | Incident Surface Average Inclination Angle (degree) | Full Width Half Maximum (degree) | Haze Value (%) | Luminance Ratio | Full Width Half Maximum (degree) |
| Example 1 | 3.37 | 4.0 | 37.35 | 1.18 | 20.1 |
| Example 2 | 7.27 | 9.4 | 73.60 | 1.02 | 24.7 |
| Example 3 | 5.00 | 6.0 | 58.25 | 1.09 | 21.6 |
| Example 4 | Max: 10.40 Min: 1.00 | 11.2 | 64.70 | 1.20 | 22.0 |
| Example 5 | 8.20 | 10.5 | 62.00 | 1.18 | 22.5 |
| Example 6 | Max: 6.00 Min: 1.00 | 7.0 | 55.00 | 1.25 | 21.5 |
| Comparative Example 1 | — | — | — | 1.00 | 27.0 |
| Comparative Example 2 | — | — | — | 1.32 | 18.4 |

INDUSTRIAL APPLICABILITY

As described above, in the present invention, by disposing a light diffuser having a particular light diffusion property on a light exit surface of a light deflector, it is possible to provide a light source device excellent in light utilization efficiency of a primary light source, and also excellent in viewing angle characteristic and image quality without sacrificing a high luminance characteristic.

The invention claimed is:

1. A light source device comprising, at least, a primary light source, a light guide that guides light emitted from said primary light source and has a light incident surface on which the light emitted from said primary light source is incident, and a light outgoing surface from which the guided light exits, a light deflector having a light entrance surface disposed adjacent to the light outgoing surface of said light guide and located so as to face said light outgoing surface, and a light exit surface on an opposite side relative to said light entrance surface, and a light diffuser having an incident surface disposed adjacent to the light exit surface of said light deflector and located so as to face the light exit surface of said light deflector, and an outgoing surface on an opposite side relative to said incident surface,
   wherein a plurality of elongated prisms arrayed side by side are formed at the light entrance surface of said light deflector, each of said elongated prisms has two prism surfaces and, at least one of said prism surfaces is formed into a convex curved surface shape, and a haze value of said light diffuser is 8 to 82%.

2. A light source device according to claim 1, wherein said light diffuser is configured in such a manner that a full width half maximum of an outgoing light luminous intensity distribution is 1 to 13 degrees when parallel light is incident thereon.

3. A light source device according to claim 1 or 2, wherein an average inclination angle of at least one of the incident surface and the outgoing surface of said light diffuser is 0.8 to 12 degrees.

4. A light source device according to claim 2, wherein a developed length of said light guide is 8 cm or less, and said light diffuser is configured in such a manner that the full width half maximum of the outgoing light luminous intensity distribution is 1 to 6 degrees when the parallel light is incident thereon.

5. A light source device according to claim 1, wherein a developed length of said light guide is 8 cm or less, and the haze value of said light diffuser is 8 to 60%.

6. A light source device according to claim 2, wherein a developed length of said light guide is greater than 8 cm and equal to or less than 23 cm, and said light diffuser is configured in such a manner that the full width half maximum of the outgoing light luminous intensity distribution is 3 to 11 degrees when the parallel light is incident thereon.

7. A light source device according to claim 1, wherein a developed length of said light guide is greater than 8 cm and equal to or less than 23 cm, and the haze value of said light diffuser is 30 to 80%.

8. A light source device according to claim 1 or 2, wherein an average inclination angle of the incident surface of said light diffuser is greater than an average inclination angle of the outgoing surface thereof.

9. A light source device according to claim 1 or 2, wherein the incident surface and the outgoing surface of said light diffuser have a convex-concave structure.

* * * * *